(12) United States Patent
Kumaresan et al.

(10) Patent No.: US 11,354,836 B2
(45) Date of Patent: Jun. 7, 2022

(54) SYSTEMS AND METHODS FOR DISPLAYING REPRESENTATIVE SAMPLES OF TABULAR DATA

(71) Applicant: Oracle International Corporation, Redwood Shores, CA (US)

(72) Inventors: Dhileeban Kumaresan, Foster City, CA (US); Rodrigo Reyes, Zapopan (MX); Sreeji Das, Fremont, CA (US); Adrienne Wong, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 377 days.

(21) Appl. No.: 16/521,268

(22) Filed: Jul. 24, 2019

(65) Prior Publication Data

US 2021/0027503 A1     Jan. 28, 2021

(51) Int. Cl.
*G06T 11/20*     (2006.01)
*G06F 40/177*    (2020.01)
*G06F 40/183*    (2020.01)
*G06F 16/26*     (2019.01)
*G06F 3/0482*    (2013.01)

(52) U.S. Cl.
CPC .......... *G06T 11/206* (2013.01); *G06F 16/26* (2019.01); *G06F 40/177* (2020.01); *G06F 40/183* (2020.01); *G06F 3/0482* (2013.01)

(58) Field of Classification Search
None
See application file for complete search history.

(56) References Cited

U.S. PATENT DOCUMENTS

| | | | |
|---|---|---|---|
| 10,510,117 B1 * | 12/2019 | Romo | G06Q 40/06 |
| 10,853,380 B1 * | 12/2020 | Agnew | G06F 16/2428 |
| 10,861,202 B1 * | 12/2020 | Agnew | G06T 11/206 |
| 2014/0247267 A1 * | 9/2014 | Kumar Kn | G16B 45/00 345/440 |
| 2016/0301708 A1 * | 10/2016 | Grondin | H04L 63/1408 |
| 2019/0026926 A1 * | 1/2019 | Crespo-Diaz | G01N 15/1429 |
| 2019/0026927 A1 * | 1/2019 | Crespo-Diaz | G01N 15/0227 |
| 2019/0026928 A1 * | 1/2019 | Fainshtein | G06T 11/206 |

* cited by examiner

*Primary Examiner* — Ariel Mercado
(74) *Attorney, Agent, or Firm* — Kilpatrick Townsend & Stockton LLP

(57) ABSTRACT

The present disclosure generally relates to systems and methods that efficiently display tabular data (e.g., a large data set of a million or more rows of data with multiple data fields). More particularly, the present disclosure relates to systems and methods that compress the tabular data to a representative data set that maintains the data density and data variation of the original tabular data, and that display the representative data set with respect to clusters formed.

20 Claims, 15 Drawing Sheets

| Request ID | Start Time | End Time | Duration | User | Application | Host | Host Type | Data-center | Status |
|---|---|---|---|---|---|---|---|---|---|
| asdlkfjhq349 | 3/20/19, 1:46 AM | 3/20/19, 1:51 AM | 5 mins | user1324 | HR | stdf82 | virtual | SLC | success |
| asdflkjh9350 | 3/20/19, 2:48 AM | 3/20/19, 2:52 AM | 4 mins | user4576 | Report | asdf92 | virtual | SLC | success |
| opijegtr9490 | 3/20/19, 2:20 AM | 3/20/19, 2:26 AM | 6 mins | user9834 | HR | asdf85 | physical | SLC | fail |
| pdbiue8359 | 3/20/19, 3:24 AM | 3/20/19, 3:29 AM | 5 mins | user0590 | HR | aohj00 | virtual | SLC | success |

500A

500B

600

SYSTEMS AND METHODS FOR DISPLAYING REPRESENTATIVE SAMPLES OF TABULAR DATA

TECHNICAL FIELD

The present disclosure generally relates to systems and methods that efficiently display tabular data (e.g., a large data set of a million or more rows of data with multiple data fields). More particularly, the present disclosure relates to systems and methods that compress the tabular data to a representative data set that maintains the data density and data variation of the original tabular data, and that display the representative data set with respect to clusters formed.

BACKGROUND

Web-based applications can log information about various user interactions. The logs may be records or messages stored as a data set at a specific data center or stored across multiple data centers. Each log record may be a row of several data fields of data. As the number and complexity of user interactions increase, the size of the data set also grows. Data sets can reach big-data scale, such as a million or more rows of data. Large data sets, however, often include log records of data that represent distinct or anomalous user interactions.

For example, a web page may have recorded log records representing interactions between a web server and millions of users. In some cases, a few users may have experienced an unusually long wait time to access the web page. In other cases, a few users may have failed to access the web page for various reasons. In either case, these small numbers of distinct or anomalous user interactions within big-data size data sets may be difficult to identify and analyze. Further, identifying which attributes or events caused the distinct or anomalous user interactions is technically challenging and time intensive.

SUMMARY

Certain aspects and features of the present disclosure relate to systems and methods for efficiently compressing a large data set (e.g., tabular data consisting of a million rows of data, such as log records) into a representative data set (e.g., 500 rows of data) that maintains the variation and density of the large data set. Further, certain aspects and features relate to systems and methods for generating and presenting an interface that automatically identifies anomalies in the tabular data, and displays a visual representation of the representative data set with the anomalies emphasized. In some implementations, certain aspects and features of the present disclosure enable a user to cluster rows of the large data set by certain user-selected data fields or by certain combinations of data fields (e.g., a rate, where the rate does not exist as a data field, but can be calculated from two or more existing data fields). Certain aspects and features of the present disclosure additionally process the large data set (e.g., tabular data with a million rows of data) to identify distinct or anomalous (e.g., statistically important or relevant) data for each cluster of rows of the tabular data. The systems and methods may automatically select a proportional representative sample of the tabular data from each cluster of rows of the tabular data to visibly represent on the interface. The representative sample of the tabular data may be selected using logic that identifies and maintains the original variation and the original density distribution of values included in data fields of the large data set. The tabular data may be stored as one or more rows of data. Each row of the tabular data may be comprised of a set of data fields, and each data field may correspond to a value (e.g., numerical or string value). For example, each row in the tabular data may correspond to a single log record with various data fields (each data field corresponding to a column of the tabular data). In another example, a row in the tabular data can correspond to an aggregation of data field values across multiple log records with the tabular data fields computed as aggregate functions involving a set of log records.

As a non-limiting example, the representative sample of the tabular data (e.g., rows of data corresponding to log records from each cluster) may be presented in a parallel coordinate chart, in which multiple parallel axes are shown and each axis of the parallel axes corresponds to an automatically selected data field of the set of data fields. The number of data fields in the set of data fields can be large (e.g., 30 data fields or more), and thus, representing all data fields of the set of data fields may be overwhelming and visually distracting. Accordingly, certain aspects and features of the systems and methods of the present disclosure include logic that, when executed, automatically selects a subset of data fields from the set of data fields. Each data field included in the subset of data fields represents data fields with values that are statistically important, as will be described in greater detail herein. For example, if 800 log records or rows of the tabular data (e.g., in the case where a row of the tabular data corresponds to an aggregation of values across multiple log records) of 1000 log records or rows of the tabular data are associated with a single user, a user identifier data field may be automatically selected and included in the subset of data fields as being statistically important to present in the parallel coordinate chart. However, continuing with the above example, if the 1000 log records or rows of the tabular data are associated evenly with various users (e.g., the 1000 log records are evenly distributed across 10 users, so that each user is associated with 100 log records), then the user identifier data field may be determined as not being statistically relevant (and thus, may not be automatically selected for inclusion in the subset of data fields corresponding to the parallel coordinate chart). Further, the low variation or low density distribution of the values in the user identifier data field of the set of log records may be an indication that the user identifier data field is not statistically important to analyze in the parallel coordinate chart.

In some implementations, the interface may enable users to auto-relate data fields of the large data set to a user-defined custom cluster operation. For example, the interface may be configured to enable the user to select one or more existing data fields from the set of data fields, on which to perform clustering (e.g., clustering based on a user-selected "status" data field and a "duration" data field). In some examples, the interface may enable the user to cluster the large data set based on a combination of one or more existing data fields (e.g., clustering based on values included in a rate data field, where the rate data field is not a data field in the set of data fields, but can be calculated by combining two existing data fields in the set of data fields). The clustering operation may be performed on the large data set using the one or more user-selected or user-created data fields of the set of data fields and one or more machine-learning-based clustering techniques. Non-limiting examples of clustering techniques may include K-mean clustering, mean-shift clustering, density-based, spatial clustering of applications with noise (DBSCAN), and expectation-maximizing clustering, however, any suitable clustering algorithm can be used. The interface may visibly depict the clustered large data set. Additionally, certain aspects and features of the present disclosure include systems and methods that process each cluster of the one or more clusters of tabular data to identify and proportionally depict distinct and/or anomalous log records or rows of the tabular data in each cluster. In some examples, the interface may be configured to enable users to mark interesting signatures and/or parameters of the clustered log records to auto prepare queries at cloud scale.

In some implementations, the interface may be configured to display a parallel coordinate chart that efficiently represents the various values of the clustered log records or rows of tabular data in a manner that is easily understandable by the user. To illustrate and only as a non-limiting example, a large data set of a million rows of log records may capture various attributes of interactions between a web server and web page visitors. The interface may be configured to receive user input corresponding to a selection of two data fields of the set of data fields that exist in log records of the large data set. The two user-selected data fields may include a status data field that corresponds to values indicating a status of a login attempt by a web page visitor that is logged in a log record. For example, the possible values of the status data field may be "success" or "fail." Additionally, the second of the two user-selected data fields may be a duration data field that corresponds to values indicating a time duration of successful or failed login attempts. For example, the values of the duration data field may include the number of minutes and/or seconds between a time when a web page visitor began the login attempt to a time when the web page visitor succeeded in logging in or to a time when the web page visitor received a failure message indicating that the login attempt failed. Certain aspects of features of the present disclosure include systems and methods that cluster the large data set based on the values included in each of the status data field and the duration data field across log records of the large data set. As a non-limiting example, four clusters of log records may be formed as a result of performing the clustering operation. Each cluster of the four clusters may represent an incomplete subset of large data set of log record. That is, the incomplete subset of log records includes some portion, but not all, of all the log records included in the large data set. In some examples, the sizes of the four subsets of log records (i.e., the number of log records included in the subset) may be different from each other.

Continuing with the above illustration and non-limiting example, certain aspects of feature of the present disclosure include systems and methods that process each cluster of log records to automatically select one or more other data fields (i.e., other than the status data field and duration data field) from the set of available data fields that include values of statistical importance (or values that indicate a pattern in other data fields) for the corresponding cluster. Processing a cluster of log records of the four clusters of log records may include executing logic that generates a decision tree that identifies which data fields of the set of data fields contributed (e.g., are relevant or pertinent as forming a pattern within values corresponding to data fields other than the status and duration data fields). The decision tree may include several nodes. Each node may represent a filter with a value condition. The value condition may be a value included in a log record. Further, the value condition may be automatically selected to filter the large data set, such that more log records of a particular cluster satisfy the value condition (e.g., include the value of the value condition within the data field of the log record) than log records of any other clusters. For example, a value condition may be "Weekday=Sunday," which can be used to filter out all log records that include a "Weekday" data field, and that do not include the value "Sunday" in that data field. Thus, the value condition of "Weekday=Sunday" is automatically selected so that the remaining log records (i.e., the log records that satisfy the value condition of "Weekday=Sunday," and thus, include the value of "Sunday" in the "Weekday" data field) include more log records of a particular cluster than any other cluster. Further, the decision tree is configured to create another node (e.g., filter) that continues to filter out log records that are not included in the particular cluster, so as result in a leaf node that only includes all log records of that particular cluster. For example, a second value condition may again filter the remaining log records (i.e., the log records that satisfy the "Weekday=Sunday" value condition) so that the remaining log records include more log records of the particular cluster than any other log record. For example, the second filter may include a value condition that corresponds to the data field "DayofMonth" representing the day of the month and the value of "24." Thus, of the remaining log records, all log records that do not include the value "24" in the data field of "DayofMonth" are filtered out. As this process of iterative filtering continues, the decision tree will result in four leaf nodes—one leaf node for each cluster of log records. The path of nodes from the root node of the decision tree (e.g., the first filter of "Weekday=Sunday") to an individual leaf node may represent data fields that are automatically selected to be included as axes in the parallel coordinate chart. If the remaining log records after the second filter described above include only log records that correspond to a particular cluster, then the path is complete. In this case, since the "Weekday" data field and the "DayofMonth" data field are included in the path from the root node to the leaf node, at least the "Weekday" data field and the "DayofMonth" data field would be included as individual axes in the parallel coordinate chart. This process continues for each cluster as different data fields may be automatically selected for different clusters. The aggregated group of selected data fields can be represented in the parallel coordinate chart, such that each axis represents an individual automatically-selected data field.

Continuing with the above illustration and non-limiting example, certain aspects and features of the present disclosure relate to systems and methods that select a representative sample of rows (which represent one or more log records) from each cluster, for which values are visually depicted on the parallel coordinate axes. A maximum number of log records to visually depict on the parallel coordinate axes may be defined (e.g., based on user definition). For example, if 500 is set as the maximum number of log records, then a total of 500 log records may be selected from across the four clusters of log records. In some implementations, the maximum number of log records may be proportionally split across the total number of clusters formed from the clustering operation. As a non-limiting example, if 1000 is set as the maximum number of log records that can be visually depicted on the parallel coordinate chart, and if the first cluster has 100,000 log records, the second cluster has 200,000 log records, the third cluster has 300,000 log records, and the forth cluster has 400,000 log records (totaling to the 1 million log records of the large data set), then the first representative sample of log records selected for the first cluster may include 100 log records, the second representative sample selected for the second cluster may include 200 log records, the third representative sample selected for the third cluster may include 300 log records, and the fourth representative sample selected for the fourth cluster may include 400 log records (totaling to the maximum number of 1000 log records). Thus, the representative sample selected for each cluster may be proportional to the number of log records included in the corresponding cluster as a percentage of the total number of log records in the large data set.

In some implementations, when the maximum number of log records to be included in the representative sample of each cluster is determined (as described above, for example), then certain aspects and features of the present disclosure include systems and methods that automatically select log records from each cluster so as to maintain the original variation of values and the original density of values across the values included in log records of the cluster. For example, selecting log records for the representative sample of each cluster may include identifying numerical boundaries across values for each automatically selected data field. To continue with the above illustration, selecting the representative sample of log records (or rows of the tabular data) from the first cluster of the four clusters of log records may include selecting the log records with the highest numerical value in each of the automatically selected data fields, and also selecting the log records with the lowest numerical value in each of the automatically selected data fields. In addition, after the numerical boundaries are selected for each automatically-selected data field (that is, the data fields automatically selected to be visually depicted on the parallel coordinate chart), then, if any log records still need to be selected to complete the representative sample for the cluster, the remaining log records are selected to represent the density distribution of values across the data field, as described in greater detail herein. If the data fields include non-numerical data (e.g., string fields), then the data fields with the highest cardinality may be ignored and the data fields with the lowest cardinality may be selected. In some implementations, each log record included in each of the representative samples can be visually depicted as a line that intersects each axis of the parallel coordinate axes. Further, the line representing a log record can intersect each axis at a coordinate that represents the value of the data field in the log record (noting again that the axis represents the range of values across the data field). In some implementations, a proportional number of rows of the tabular data may be selected from each class (e.g., a group of rows of tabular data that share a common characteristic or that correspond to one of the clustered rows of tabular data) associated with each leaf node of the decision tree. Minimum and maximum values of each of the numerical data fields present in the path starting from a root node to a leaf node may be selected. By initially selecting the minimum and maximum values of each data field for the representative sample, the log analytics system can capture the value boundaries of each data field that is included in the path of the decision tree (i.e., from the root to the leaf node). For the remaining number of available rows (e.g., the remainder may be the maximum number of rows selected for presentation on the parallel coordinate axes minus the selected rows for the minimum and maximum values) for that class and for that leaf node, rows of tabular data may be selected to represent the density distribution of values in each of the numerical data fields. In some examples, a number of quantiles may be selected from each of the numerical data fields in the path of the decision tree (e.g., the path from the root node to the leaf node) starting from the data fields that exhibit maximum variations in values. It will be appreciated that each leaf node need not correspond to a single cluster of table rows. For example, if the decision tree is constrained to a defined height (e.g., a defined number of levels), then a particular leaf node may correspond to more than one cluster. In this case, a representative sample (e.g., the boundary values, such as the maximum value and minimum value) is automatically selected from each cluster corresponding to the node.

It will be appreciated that the logic executed by a log analytics system can identify anomalies in log records using one or more anomaly detection algorithms, such as density-based anomaly detection (e.g., K-nearest neighbor or local outlier factor), clustering-based anomaly detection (e.g., K-means), support vector machine-based anomaly detection, and other suitable anomaly detection algorithms. For example, if a cluster has too few log records, that leaf node may be classified as an anomaly. In this case, the logic highlights this leaf node to make sure the anomalies are brought to the user's attention in the interface. It will also be appreciated that on a given axis of the parallel coordinate axes, the coordinate markings can be dynamically set so as to group together values that may not be statistically important, but individually highlight values that are statistically important for the user evaluating the log data to analyze. For example, in some cases, user identifiers can be grouped together as a single tick on an axis corresponding to the user identifier data field. However, the logic may individually list a user for a single tick on the axis for certain user identifiers (e.g., for users which the logic identifies as being statistically important).

Certain aspects and features of the present disclosure may include a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: storing a set of log records, each log record of the set of log records including a set of data fields, and each data field of the set of data fields corresponding to a value. The computer-implemented method also includes identifying tabular data representing the set of log records, the tabular data including a set of rows and a set of columns, each row of the set of rows representing one or more log records of the set of log records, and each column of the set of columns representing a data field of the set of data fields. The computer-implemented method also includes receiving input corresponding to a user selection of one or more data fields from amongst the set of data fields; clustering the tabular data based on one or more values corresponding to the user-selected one or more data fields, the clustering forming one or more subsets of rows of the set of rows of the tabular data; generating an interface including a visual representation of the tabular data, the generation including: automatically selecting, for each subset of the one or more subsets of rows, one or more other data fields from the set of data fields, the automatic selection of the one or more other data fields indicating a correlation between a value of the one or more other data fields and the subset of rows; displaying a plurality of parallel coordinate axes in the visual representation of the tabular data, each parallel coordinate axis of the plurality of parallel coordinate axes representing a range of values of a user-selected data field or an automatically-selected data field; and selecting a representative sample of rows from each subset of the one or more subsets of rows of the tabular data. The computer-implemented method also includes displaying a set of paths across the parallel coordinate axes, each path of the set of paths representing a row from the representative sample of rows, and where for each row of the representative sample of rows, the path representing the row intersects a parallel coordinate axis of the parallel coordinate axes at a value of a data field included in the row. Other embodiments of this aspect include corresponding computer systems, apparatus, and computer programs recorded on one or more computer storage devices, each configured to perform the actions of the methods.

Implementations may include one or more of the following features. The computer-implemented method where the automatic selection of the one or more other data fields further includes: processing the tabular data to generate a decision tree, where the decision tree includes one or more nodes, each node of the one or more nodes of the decision tree corresponding to a condition that filters the set of rows of the tabular data, the condition corresponding to a particular value of a particular data field from the set of data fields; identifying one or more leaf nodes of the decision tree, each leaf node of the one or more leaf nodes representing a subset of rows of the one or more subsets of rows formed by clustering the tabular data. The computer-implemented method may also include determining, for each leaf node of the one or more leaf nodes, a sequence of nodes of the decision tree that filters the set of rows of the tabular data to a subset of rows that corresponds to the leaf node, the sequence of nodes including one or more conditions that filter the set of rows of the tabular data to a particular subset of rows of the one or more subsets of rows, and each condition included in the one or more conditions corresponding to a data field of the one or more other data fields. The computer-implemented method may also include automatically selecting the one or more other data fields based on the one or more conditions included in the sequence of nodes. The computer-implemented method where selecting the representative sample of rows from each subset of rows further includes: defining a maximum number of rows for selection, the maximum number of rows being lower than a total number of rows included in the set of rows of the tabular data. The computer-implemented method may also include for each subset of rows of the one or more subsets of rows, identifying a percentage of the maximum number of rows based on a number of rows included in the subset of rows. The computer-implemented method may also include selecting the representative sample of rows for each subset of the one or more subsets of rows, the selection of rows of the representative sample being based on the percentage of the maximum number of rows that corresponds to the subset of rows. The computer-implemented method where at least one of the automatically-selected one or more other data fields is not included in the set of data fields, but rather created from two or more data fields included in the set of data fields. The computer-implemented method further including: receiving an additional input corresponding to a selection of an area of the parallel coordinate axes. The computer-implemented method may also include identifying a number of rows visually represented within the selected area of the parallel coordinate axes. The computer-implemented method may also include visually inhibiting remaining rows of the representative sample not included in the selected area of the parallel coordinate axes. The computer-implemented method where the representative sample of rows from each subset of rows is selected to represent a density or a variation of values included in the subset of rows. The computer-implemented method where the representative sample of rows from each subset of rows is selected to include anomalous values included in the subset of rows. Implementations of the described techniques may include hardware, a method or process, or computer software on a computer-accessible medium.

One general aspect includes a system, including: one or more data processors; and a non-transitory computer-readable storage medium containing instructions which, when executed on the one or more data processors, cause the one or more data processors to perform operations including: storing a set of log records, each log record of the set of log records including a set of data fields, and each data field of the set of data fields corresponding to a value. The system also includes identifying tabular data representing the set of log records, the tabular data including a set of rows and a set of columns, each row of the set of rows representing one or more log records of the set of log records, and each column of the set of columns representing a data field of the set of data fields. The system also includes receiving input corresponding to a user selection of one or more data fields from amongst the set of data fields. The system also includes clustering the tabular data based on one or more values corresponding to the user-selected one or more data fields, the clustering forming one or more subsets of rows of the set of rows of the tabular data; generating an interface including a visual representation of the tabular data, the generation including: automatically selecting, for each subset of the one or more subsets of rows, one or more other data fields from the set of data fields, the automatic selection of the one or more other data fields indicating a correlation between a value of the one or more other data fields and the subset of rows. The system also includes displaying a plurality of parallel coordinate axes in the visual representation of the tabular data, each parallel coordinate axis of the plurality of parallel coordinate axes representing a range of values of a user-selected data field or an automatically-selected data field. The system also includes selecting a representative sample of rows from each subset of the one or more subsets of rows of the tabular data; and displaying a set of paths across the parallel coordinate axes, each path of the set of paths representing a row from the representative sample of rows, and where for each row of the representative sample of rows, the path representing the row intersects a parallel coordinate axis of the parallel coordinate axes at a value of a data field included in the row. Other embodiments of this aspect include corresponding computer systems, apparatus, and computer programs recorded on one or more computer storage devices, each configured to perform the actions of the methods.

One general aspect includes a computer-program product tangibly embodied in a non-transitory machine-readable storage medium, including instructions configured to cause a data processing apparatus to perform operations including: storing a set of log records, each log record of the set of log records including a set of data fields, and each data field of the set of data fields corresponding to a value. The computer-program product also includes identifying tabular data representing the set of log records, the tabular data including a set of rows and a set of columns, each row of the set of rows representing one or more log records of the set of log records, and each column of the set of columns representing a data field of the set of data fields. The computer-program product also includes receiving input corresponding to a user selection of one or more data fields from amongst the set of data fields; clustering the tabular data based on one or more values corresponding to the user-selected one or more data fields, the clustering forming one or more subsets of rows of the set of rows of the tabular data; generating an interface including a visual representation of the tabular data, the generation including: automatically selecting, for each subset of the one or more subsets of rows, one or more other data fields from the set of data fields, the automatic selection of the one or more other data fields indicating a correlation between a value of the one or more other data fields and the subset of rows. Other embodiments of this aspect include corresponding computer systems, apparatus, and computer programs recorded on one or more computer storage devices, each configured to perform the actions of the methods.

Advantageously, the present disclosure efficiently clusters log records or rows of tabular data based on user-selected data fields, and uses machine-learning to quickly identify correlated values (in log records or rows of tabular data) from seemingly related or unrelated values within log records that may be stored across data centers. This significantly improves the ability for users to visualize, interact, and analyze large tabular data sets.

BRIEF DESCRIPTION OF THE DRAWINGS

The specification makes reference to the following appended figures, in which use of like reference numerals in different figures is intended to illustrate like or analogous components.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
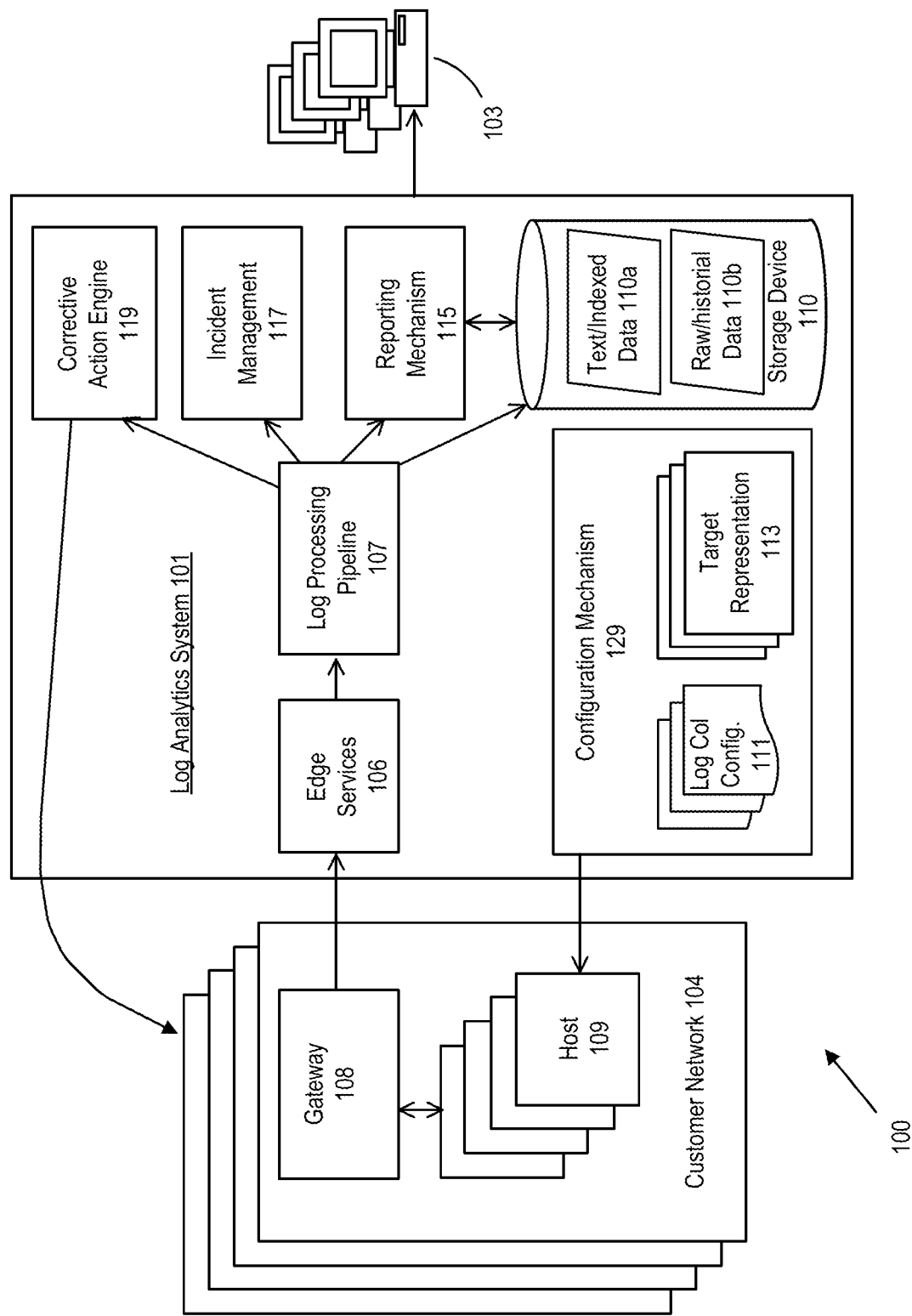
FIG. 1A illustrates an example system for configuring, collecting, and analyzing log data according to some embodiments of the present disclosure.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
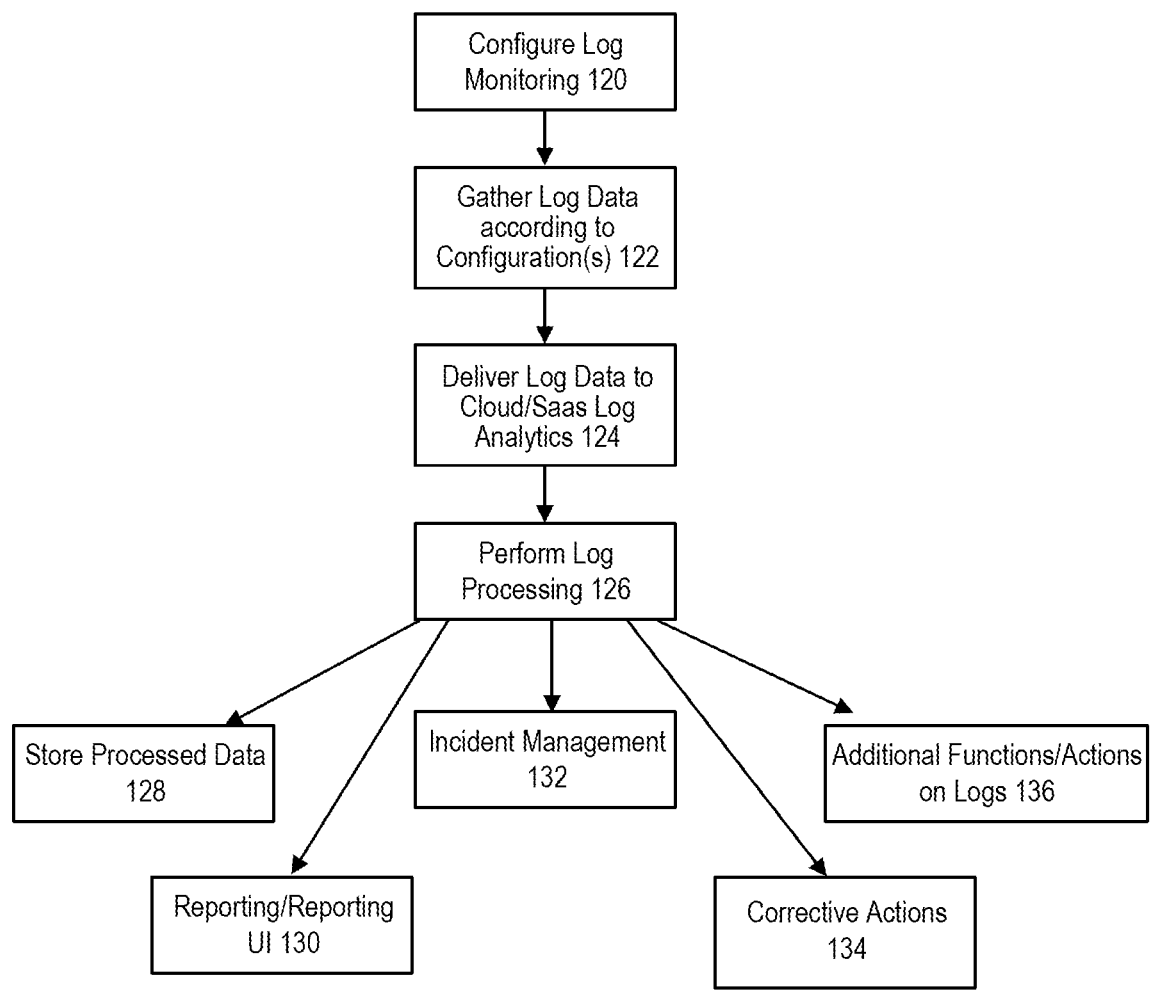
FIG. 1B illustrates a flowchart of an approach to use a system to configure, collect, and analyze log data.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration Ill may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to"***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source local search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
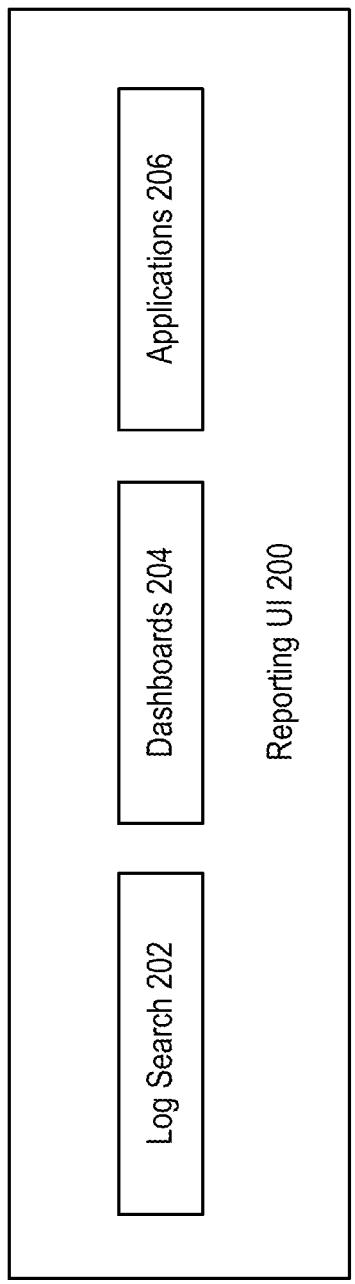
FIG. 2 illustrates an example of a reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
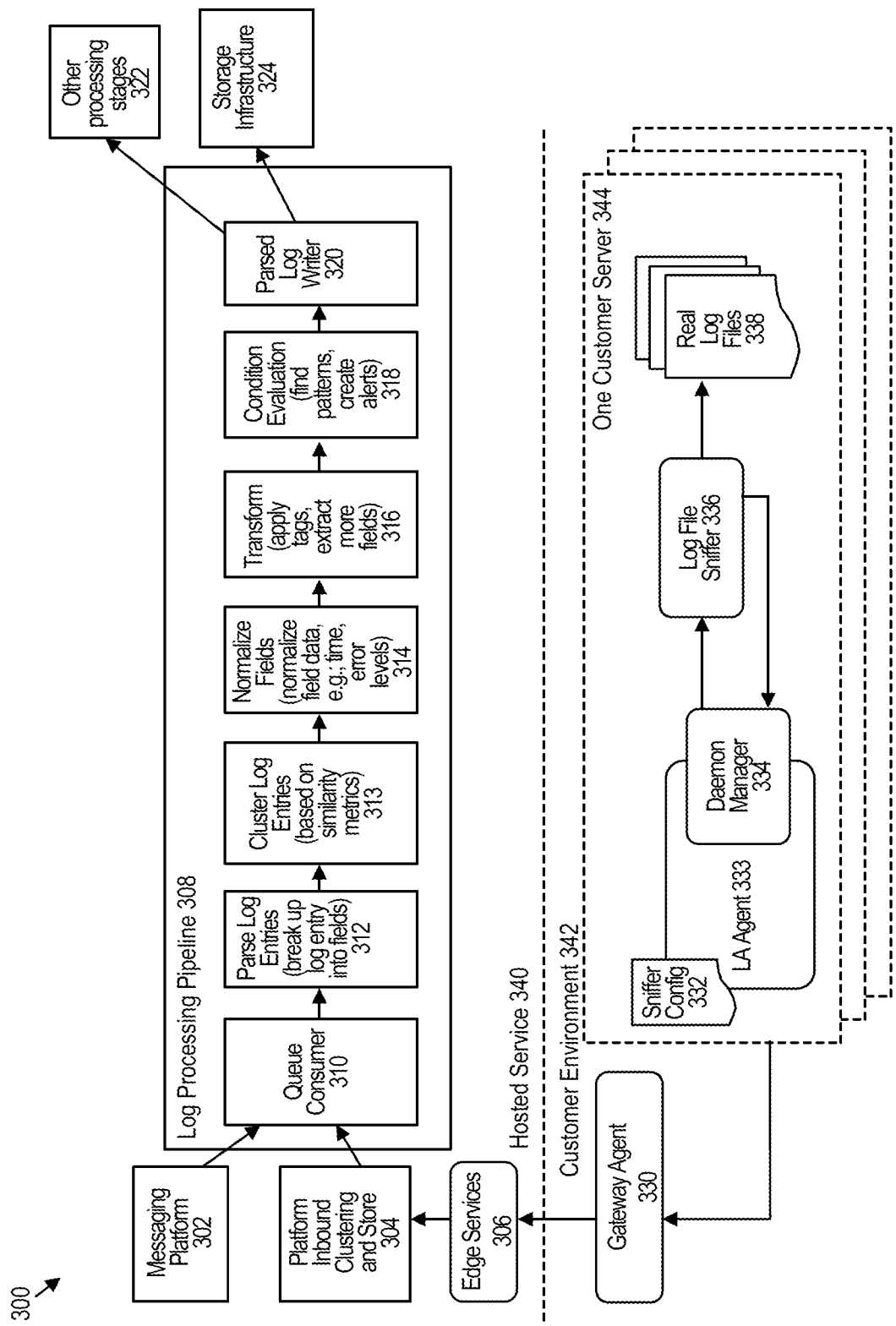
FIGS. 3A-3C are flow diagrams illustrating the internal structure of the log analytics system at a host environment.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case un-abbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
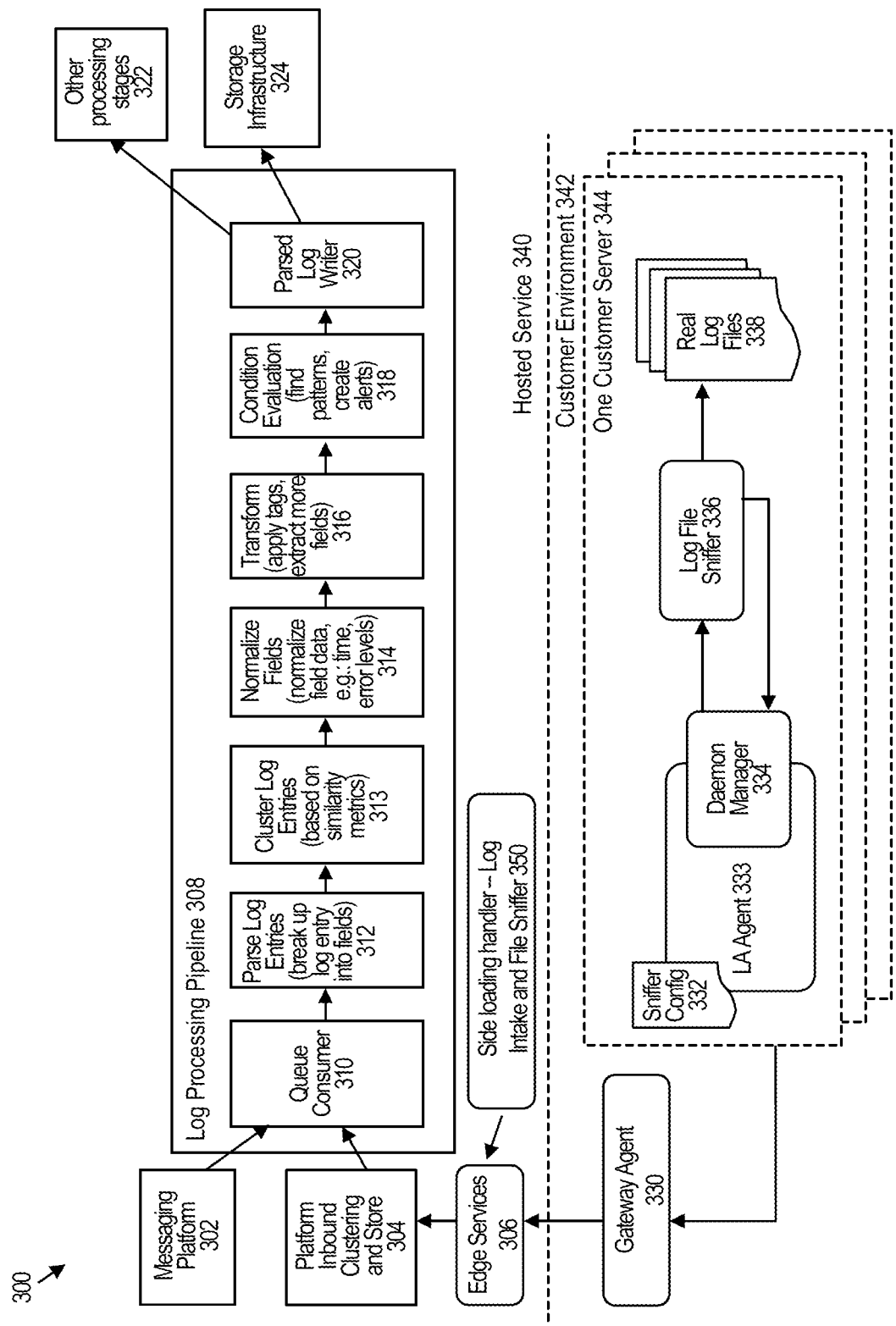
Figure 3C:
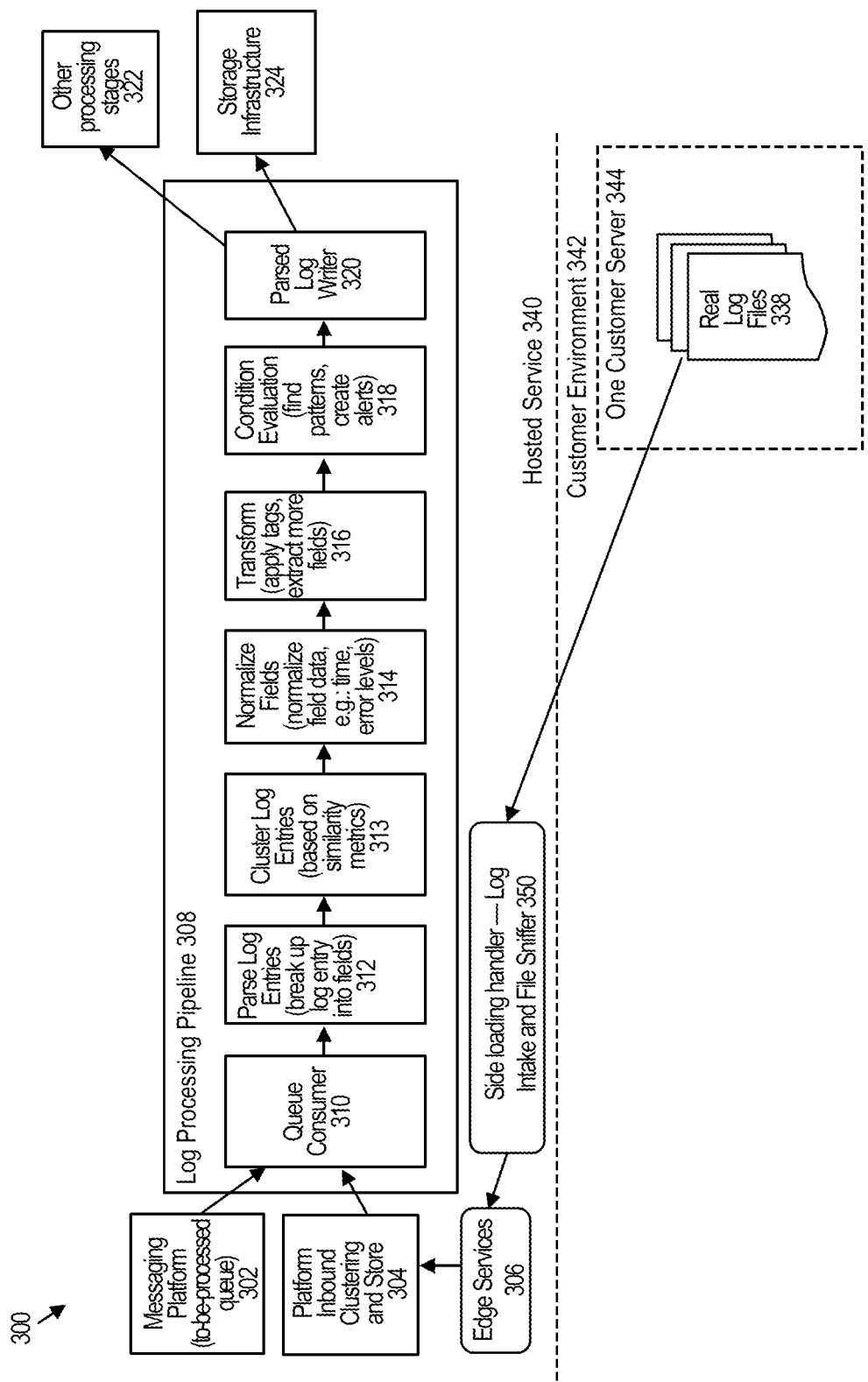

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Log records can record various attributes of user interactions with an application. The log records recorded for a particular user interaction may be stored at a single data center or across multiple data centers. The log records may also separately record different phases of user interactions (e.g., a login interaction, a sign out interaction, etc.), and the log records representing a particular user interaction may be stored across multiple data centers. Log analysis involves the evaluation of those log records to identify distinct or anomalous log records that indicate an issue with the application. Further, a user evaluating a data set of log records for distinct or anomalous log records may cause the underlying data of the log records to be populated in tabular form (e.g., in a table with multiple rows and multiple columns). A row of the multiple rows of the tabular data may represent an individual log record. A column of the multiple columns of the tabular data may represent an individual data field included in the log record. For example, a value corresponding to a data field may be presented in a cell of the tabular data. In some scenarios, the tabular data can reach big-data scale (e.g., a million rows of log records).

Evaluating large tabular data using log analysis platforms can be inefficient, burdensome, and time consuming due to the big-data scale of the tabular data. For instance, identifying which data centers caused the longest duration of a particular type of user interaction may be very tedious when scrolling through a million rows of log records that make up the tabular data. Certain aspects and features of the present disclosure relate to systems and methods that enable a user to cluster the tabular data based on user-selected data fields. Further, the systems and methods can execute logic that automatically compresses the tabular data to a representative data set (e.g., consisting of 500 rows of log records) that maintains the density distribution and variation of values of log records for a given cluster of log records.

Additionally, the systems and methods can generate an interface that includes parallel coordinate axes, such that each axis of the parallel coordinate axes corresponds to a data field of a subset of the set of data fields available within any given log record. Each data field of the subset of data fields can be automatically selected based on a path of a decision tree that is automatically constructed by a server. The path may include a sequence of value conditions that filter the tabular data to one or more leaf nodes. A leaf node represents a cluster of log records, which result after performing the clustering operation based on the user-selected data fields. The subset of data fields may represent the correlated data fields for each cluster of log records. For instance, a correlated data field may be a data field (other than the user-selected data fields) that at least in part contributed to the formation of the cluster of log records. As a non-limiting example, if the tabular data is clustered by a status data field, which can correspond to a "success" value or a "fail" value, then a first cluster will be formed that corresponds to all log records in which the status data field has a value of "success," and a second cluster will be formed that corresponds to all log records in which the status data field has a value of "fail." A correlated data field to the status data field may be a data center that processed the user interaction. For instance, a total of four data centers may be running servers to host an application. Various attributes of user interactions with the application may be recorded in log records. If, for example, most or all of the log records in the "fail" cluster are log records for which a particular data center processed the failed user interactions, then the data center may be a data field that is correlated to the status data field. That is, data field value representing the particular data center that processed the failed user interactions More specifically, the value of the data center data field that corresponds to the particular data center that processed most or all of the failed user interactions is correlated to the status data field (or to the "fail" cluster of log records). Thus, according to certain embodiments, the logic described herein can, when executed, automatically identify the correlated data fields and/or data field values that contribute to forming the "fail" cluster, thereby enabling a user to quickly and easily identify relevant parameters that may have caused an issue with the application.

A proportional and representative sample of log records can then be selected from each cluster. The representative sample of log records corresponding to each cluster can be visually depicted over the parallel coordinate axes. For example, a set of paths (e.g., lines) can be visually depicted on the parallel coordinate axes, such that each path is a visual depiction of a single log record included in the representative sample of log records. Each path intersects an axis, which represents a data field, at a value included in the log record. For example, if a given log record includes a status data field, and if that status data field corresponds to a value of "success," then the path that visually depicts the log record may intersect the axis representing the status data field at a value of "success."

The visual depiction of the set of paths over the parallel coordinate axes advantageously provides a representation of the tabular data that enables a user to easily recognize the density distribution and variation of values across log records within a cluster. Further, the visual depiction of the set of paths over the parallel coordinate axes also enables the user to easily identify other data fields that relate to the user-selected data fields used for clustering.

Figure 4:
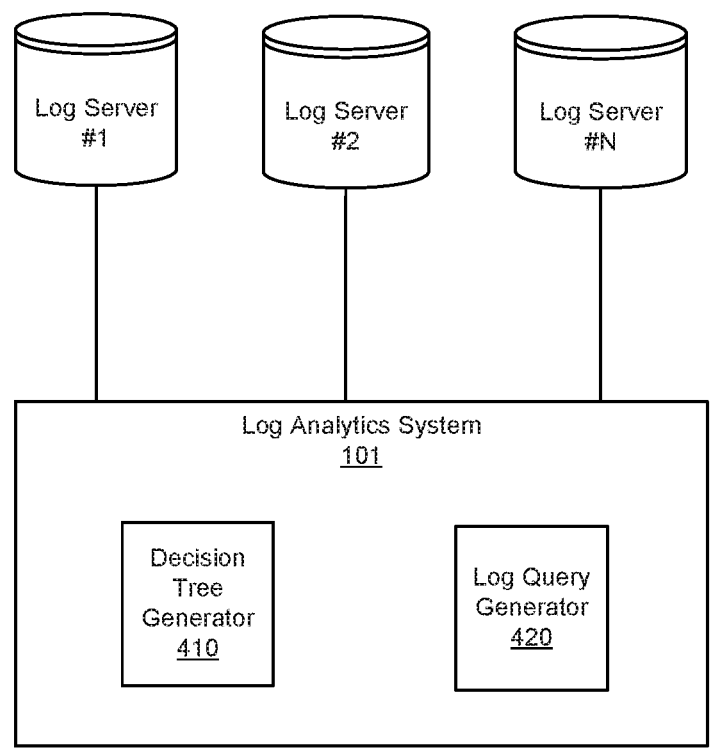
FIG. 4 is a block diagram illustrating an example network environment for efficiently representing large data sets.

FIG. 4 shows an example network environment 400 that efficiently compresses large data sets into representative samples of log records, while maintaining the density distribution and variation of values included in the log records of the original large data sets. In some implementations, network environment 400 may be a network of computing devices including any number of log servers (e.g., log server #1 through log server #N) and log analytics system 101. Log server #1 through log server #N may be servers configured to store log records captured during user interactions with one or more applications. For example, when a user device communicates with a web server to log in to a web page, various attributes of the user interaction can be captured in one or more log records, such as the time duration of the user interaction, the data center that processed the user interaction, and so on. The one or more log records may be stored at a single log server, such as log server #1, or across multiple log servers, such as log server #1 and log server #2. In some examples, multiple log records may be recorded for a single transaction flow. For example, a user may log in to a web page, navigate to a specific subpage, and then log out of the web page. The flow of logging in, navigating to the subpage, and then logging out of the web page may be captured across multiple log records. In some cases, the multiple log records of the single transaction flow may be stored across multiple log servers. For example, log server #1 may store the log record capturing the "logging in" user interaction, log server #2 may store the log records capturing the "navigating to a specific web page" user interaction, and log server #3 may store the log records capturing the "logging out" user interaction. In some cases, all log records representing the transaction flow may be stored at a single log server.

Log analytics system 101 may be a cloud-based and/or SaaS-based (software as a service) architecture configured to service log analytics functionality as a service on a hosted platform. Further, log analytics system 101 is capable of providing the log analytics service to multiple separate customers, and can be scaled to service any number of customers. Log analytics system 101 may be configured to provide an interface that enables a user to analyze log records by building queries that can be used to search through the log records stored at log server #1 through log server #N. In some implementations, log analytics system 101 may include decision tree generator 410 and log query generator 420, each of which can be used to facilitate with the log record analysis functionality.

In some implementations, decision tree generator 410 can be any network of servers and/or databases configured to store logic that, when executed, can cause a decision tree to be generated for a given data set (e.g., tabular data). Decision tree generator 410 may be configured to build a decision tree that automatically identifies a sequence of one or more data fields (e.g., a path) that are correlated with at least one of the user-selected data fields. Further, the decision tree includes one or more nodes and one or more leaf nodes. Each leaf node may represent an individual cluster of log records of the large data set of log records. A node of the one or more nodes may correspond to a value condition that can be used to iteratively filter out log records that are not included in a particular cluster, so that the leaf node includes only log records of the particular cluster. Filtering using value conditions will be described in greater detail in FIG. 8.

In some implementations, log analytics system 101 may execute logic that causes a proportional representative sample of log records to be automatically selected from the leaf nodes. A different representative sample is selected for each cluster of log records. Further, the number of log records included in the representative sample for each cluster is proportional to the size of the cluster. Additionally, the log records included in the representative sample are selected so as to maintain the original distribution density of values for a given data field. For instance, if a range of numerical values of a data field is between 2 and 90, but the distribution density of the range of numerical values is high (or above a threshold value) between 70 and 90, the representative sample of log records will be selected so as to maintain the same distribution density of values. As a non-limiting example, the density distribution of numerical values included in log records may be calculated using the probability density function. Continuing with the example above, the representative sample may comprise of more log records that include values between 70 and 90 for the data field than log records that include values between 2 and 70, so as to maintain the density distribution that exists in the original data between the values of 70 and 90.

In some implementations, generating the decision tree may be initialized (e.g., sped up) by checking boundary values of various fields within a cluster of log records, and then splitting the range of numerical values into groups, such that the groups have the lowest Gini score as possible among these splits. If a suitable Gini score cannot be obtained (e.g., a Gini score cannot be obtained that is below a threshold value), then the splits may be determined based on n quantiles generated from fields belonging to log records in each of the clusters. In some implementations, the decision tree creation is chasing to relate to the clusters as many different, yet relevant data fields as possible. In examples where the data field does not correspond to numerical values (but rather a string field, for example), then log analytics system 101 may ignore data fields that have a cardinality above a certain threshold. The higher the cardinality of a particular data field, the less likelihood that the data field is correlated to a user-selected data field because the particular data field with high cardinality values would have no pattern, and thus, would not be statistically relevant for log records of a particular cluster. For example, if a user identifier data field has a 1000 unique values out of a 1000 log records, then the user identifier data field may be ignored (e.g., not included as an axis in the parallel coordinate axes), because the cardinality of the string values across the 1000 log records indicates that the user identifier data field does not representing a pattern of statistical importance. Conversely, if the cardinality of the data field is low (e.g., if 800 values in the data field across 1000 log records corresponded to the same user), then the data field would be correlated to the user-selected data field because most of the field values of the 1000 field values correspond to the same user, and thus, that user identifier would be statistically important as representing a pattern. Additionally, for string field values, the split may be checked by using the string field values in descending order of cardinality.

In some implementations, log analytics system 101 may include log query generator 420, which can be any network of servers and/or databases configured to store logic that, when executed, can cause an interface to be displayed that enables a user to query log records. In some implementations, log query generator 420 can configure the interface to enable the user to mark and override of any custom parameters or values in each of the automatically-selected data fields. In some implementations, the interface is configured to enable the user to highlight data fields (e.g., axes of the parallel coordinate axes) or portions of a coordinate axis. In some implementations, the interface is configured to enable the user to label any selected log records visualized on the parallel coordinate axes as custom additional parameters or values, and then select, drill-down, drop-down select, or query those selected log records. Additionally, the interface is configured to enable the user to later reference the labelled custom group of log records, and, in the later reference, potentially over-ride at least some of the selection, such that the reference serves as a baseline for query parameters and not a hard filter that was pre-applied. The user marking and labeling features of the interface are described in greater detail with respect to FIG. 7.

Figures 5A, 5B:
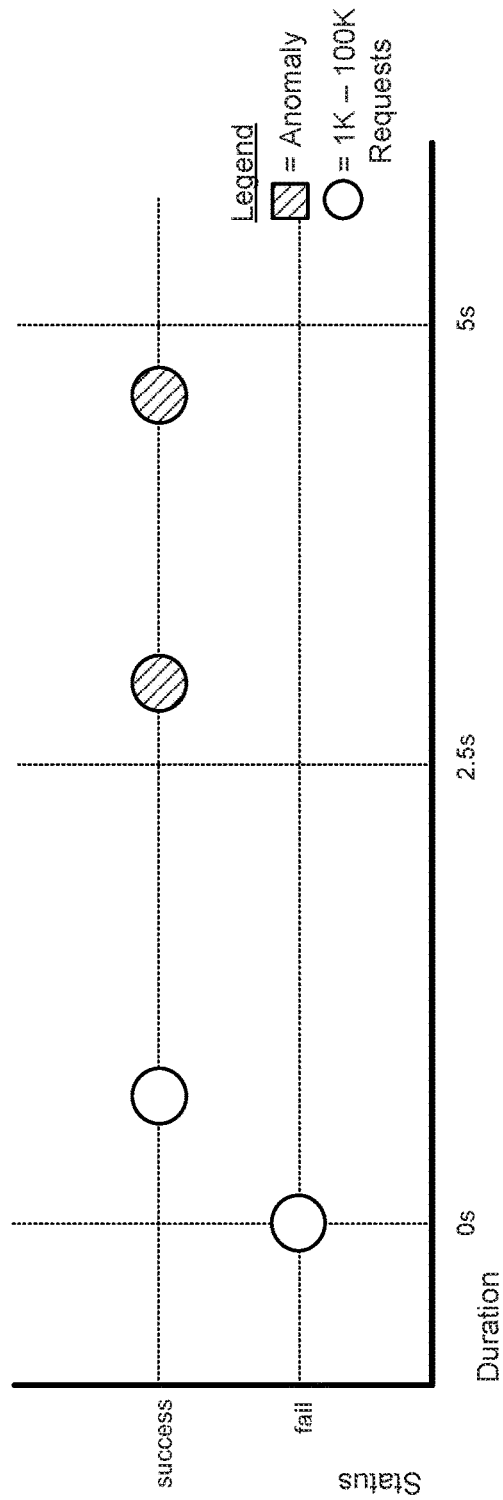
FIG. 5A is an example interface illustrating tabular data.
FIG. 5B is an example interface illustrating a result of the clustering operation using user-selected data fields of the tabular data shown in FIG. 5A.

FIG. 5A shows interface 500A which presents an example portion of tabular data. Interface 500A may enable a user to select data field 510 (i.e., the "duration" data field) and data field 520 (i.e., the "status" data field), which may be used to cluster rows of the tabular data. Notably, the tabular data shown is only a portion of the tabular data, which can reach big-data scale (e.g., one million or more rows of data). Each row of the tabular data may correspond to a single log record or an aggregation of values across multiple log records. For instance, FIG. 5B shows example interface 500B illustrating a result of the clustering operation using the user-selected data fields (i.e., the "duration" data field and the "status" data field). Interface 500B may initially display tabular data, which may comprise one or more log records displayed in a table form, such that a row corresponds to an individual log record and a column corresponds to a data field included in the log record. Interface 500B may also enable the user to select one or more data fields, around which to cluster the log records of the tabular data. As a non-limiting example, FIG. 5B illustrates clustered tabular data around two user-selected data fields: the status data field (which can corresponds to two values, "success" or "failed") and the duration data field (which can be a numerical value representing the time it took for the user transaction to be processed). As shown in the example illustration, clustering a certain set of tabular data created four clusters of log records represented as bubbles in FIG. 5B. Each bubble in FIG. 5B represents a subset of the tabular data set of log records. Non-limiting examples of clustering techniques may include K-mean clustering, mean-shift clustering, density-based, spatial clustering of applications with noise (DBSCAN), and expectation-maximizing clustering, however, any suitable clustering algorithm can be used. In some implementations, the clustering operation may also identify anomalous log records. For instance, anomalous clusters of log records may be log records for which values have a low density distribution or a large duration, such as the bubble shown in FIG. 5B that is centered on "5 mins, 50 sec" of the duration axis.

Advantageously, while interface 500B represents four distinct subsets of log records of the tabular data, certain aspects and features of the present disclosure process the log records in each cluster to identify whether there are any other data fields (not from the user-selected data fields) that are correlated to the user-selected data fields as a data field that is statistically important to the user-selected data fields or at least as a data field for which values across multiple log records represented a pattern in association with the user-selected data fields.

To illustrated and as a non-limiting example, one of the four clusters of log records represents a cluster of log records associated with the status value of "failed." The log records that were clustered in the "failed" bucket may include log records that captured instances in which users were unable to log in to a web page due to a failure to process and complete the user request to log in to the web page. Certain aspects and features of the present disclosure, at least described in FIGS. 6-9, process the log records of the "failed" cluster of log records to identify which data fields and field values may have caused or been significant in causing the failure of processing and completing the user request to log in to the web page.

Figure 6:
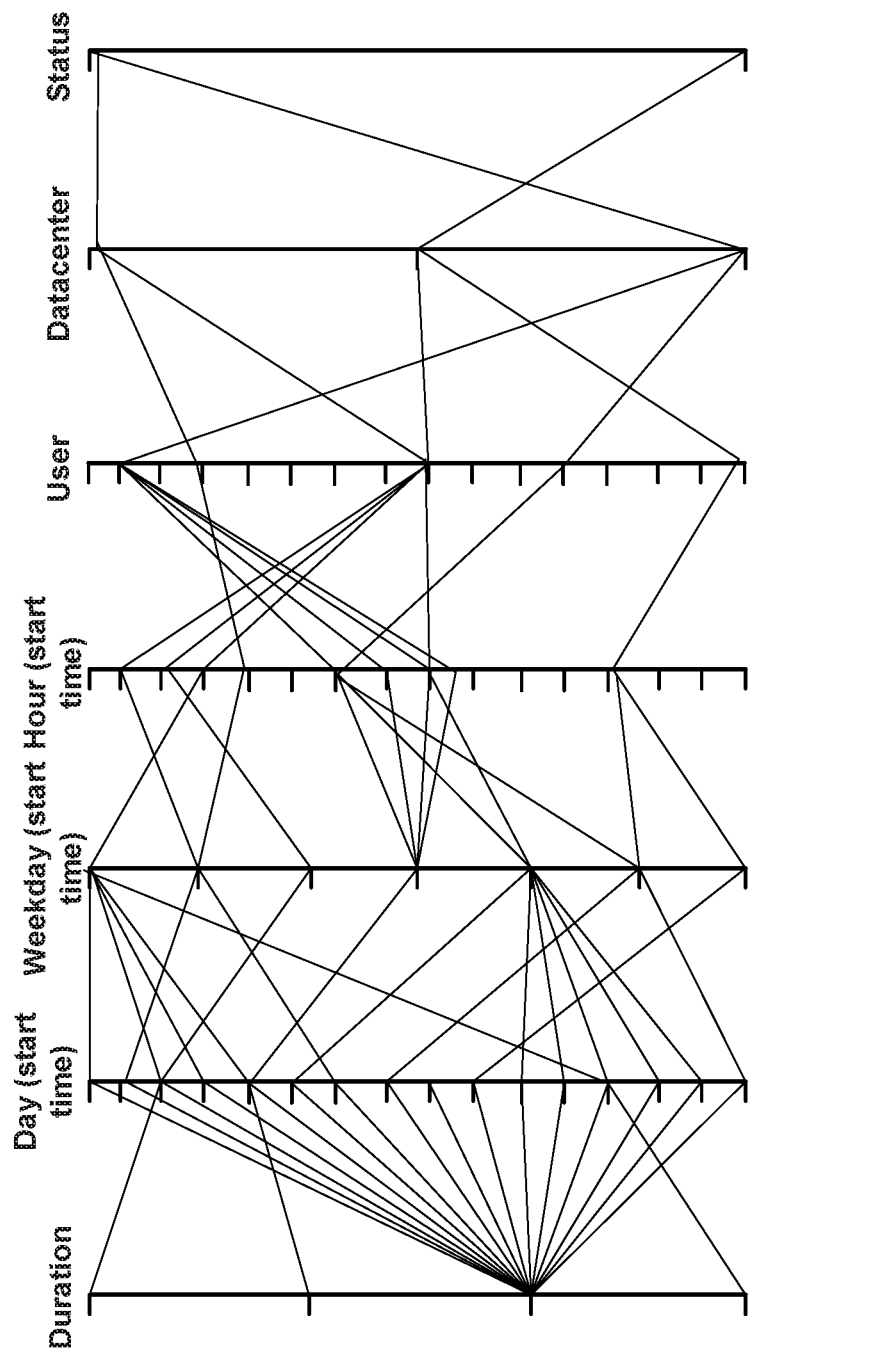
FIG. 6 is an example interface illustrating a set of paths across parallel coordinate axes visually depicting tabular data derived from one or more log records.

Continuing with the example of FIGS. 5A-5B, in which the user-selected data fields were the status data field and the duration data field, FIG. 6 shows example interface 600 illustrating a set of paths across parallel coordinate axes visually depicting the clustered rows of tabular data of FIG. 5A. Interface 600 illustrates parallel coordinate axes and a set of paths depicted across the parallel coordinate axes. The parallel coordinate axes include seven axes: a duration axis, a day-of-the-month axis (labeled as "day"), a day-of-the-week axis (labeled as "weekday"), an hour axis, a user identifier axis, a data center identifier axis, and the status axis. Other than the duration axis and the status axis, each axis of the parallel coordinate axes corresponds to a data field that was automatically selected from a set of available data fields included in the log records. The automatic selection of the day-of-the-month axis, the day-of-the-week axis, the hour axis, the user identifier axis, and the data center identifier axis (not including the duration axis and the status axis because the duration data field and the status data field were selected by the user for the clustering operation) is described in greater detail with respect to FIG. 8. Additionally, each cluster may be presented on the duration axis. For example, each tic on the duration axis of FIG. 6 may correspond to a bubble illustrated in FIG. 5B.

In some implementations, a data field corresponding to an axis in interface 600 may not exist as a data field in any log record, but rather may be calculated from one or more data fields that do exist in the log records. For example, the parallel coordinate axes illustrated in interface 600 includes the day-of-the-week axis, however, the log records may not include a corresponding day-of-the-week data field. Instead, the log analytics system may generate the day-of-the-week data field from a timestamp included in the log records. The timestamp may be captured at the beginning of every user interaction. The day of the week on which the timestamp was captured may be calculated and used at the value for the day-of-the-week data field (labeled as "weekday"). In some implementations, the log analytics system may automatically identify and split a date/time data field included in the tabular data and compute one or more internal data fields for each row of tabular data. For example, the day of the week, month, year, date, hour, minute, and seconds may be computed, and these engineered data fields may be used in the construction of the decision tree to identify if there are any time patterns or correlations between existing data fields and/or engineered data fields. The engineered data fields (e.g., "Weekday") may be included as axes in the parallel coordinate chart. Further, as an example, at least one of the automatically-selected one or more data fields may not be included in the set of data fields, but rather is a time-related data field that is automatically-created (e.g., identifying the day of the week associated with the timestamp of a log record and using only the day as a data field) or is a data field derived from one or more data fields included in the set of data fields (e.g., ingestion rate).

In some implementations, the ticks or notches on an axis may be configured to emphasize or highlight interesting or potentially anomalous field values. For example, the user identifier axis is divided into several ticks or notches, such that each tick or notch represents one or more values (i.e., one or more user identifiers). The log analytics system can automatically group values together, such as grouping user 1 and user 2 in the first tick of the user identifier axis. However, for users that exhibit interesting characteristics or statistically relevant characteristics (e.g., a particular user is associated with too few or too many user interactions), the log analytics system automatically provides individual ticks or notches for these user identifiers, such as for user 5 on the user identifier axis. Doing so provides an easy mechanism to highlighting potentially anomalous or statistically relevant field values that the user may be interesting in viewing in interface 600. In some implementations, the log analytics system may prioritize the representation of clusters of log records or rows of tabular data that are anomalous over the representation of clusters of log records or rows of tabular data that are not anomalous. Further, the log analytics system runs logic that is configured to make the best effort to accurately represent each of the clusters. However, in situations where the representative sample of rows (e.g., 500 rows selected from the one millions rows of the tabular data) is fully selected before all of the clusters are accurately represented, then the log analytics system prioritizes the representation of any anomalous clusters over any non-anomalous clusters.

In some implementations, each path of the set of paths may represent an individual log record. Further, the values corresponding to data fields of the log record may be visually depicted at the point where the path intersects an axis. For example, one of the values on the data center axis represents a "Salt Lake City" data center. Any log record that includes the string value "Salt Lake City" in the data center data field may be represented by a path crossing the axis at the tick or notch corresponding to "Salt Lake City."

It will be appreciated that interface 100 may be selectable and customizable by the user. For instance, the user can select a portion of the set of paths to highlight the log records corresponding to the selected paths, and then label the selected log records, for example.

Figure 7:
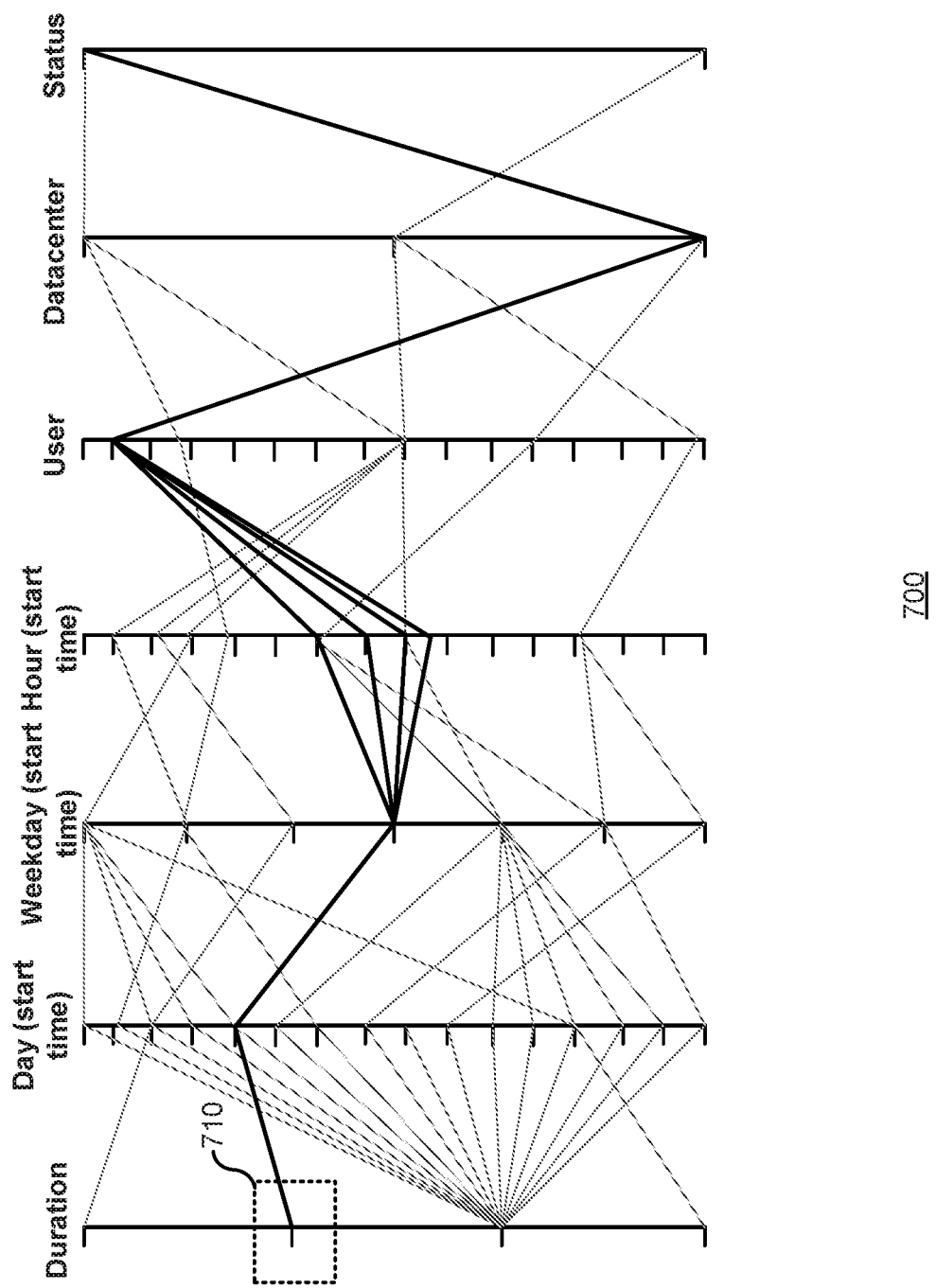
FIG. 7 is another example interface illustrating a set of paths across parallel coordinate axes visually depicting tabular data derived from one or more log records.

FIG. 7 shows example interface 700 illustrating one or more highlighted or emphasized paths of the set of paths across parallel coordinate axes. As only a non-limiting example, the user may highlight a portion of interface 700 to create selection 710. Selection 710 may be created by the user controlling the cursor to encompass one or more paths of the set of paths. When the creation of selection 710 is complete, the log analytics system identifies any paths that were included within selection 710. Further, the log analytics system may then identify the log record that corresponds to each of the selected paths. The user can perform operations, such as labeling, marking, or revising parameters or values, on the selected paths of the set of paths. Additionally, as shown in FIG. 7, in some implementations, the log analytics system may highlight the selected paths throughout the parallel coordinate axes and visually inhibit all remaining paths.

In some implementations, interface 700 may enable the user to highlight axis portions of an axis of the parallel coordinate axes and label the highlighted as custom additional parameters values. Additionally, once one or more paths of the set of paths are selected for highlighting, then the user can easily select, drill-down (e.g., access more data or information about the selected log records corresponding to the selected paths), drop-down select or query the log servers for additional information. Advantageously, the user can later reference the labels, and, in the later reference, potentially over-ride at least some of the selection. In this case, the reference may serve as a baseline for query parameters, rather than a pre-applied filter.

Figure 8:
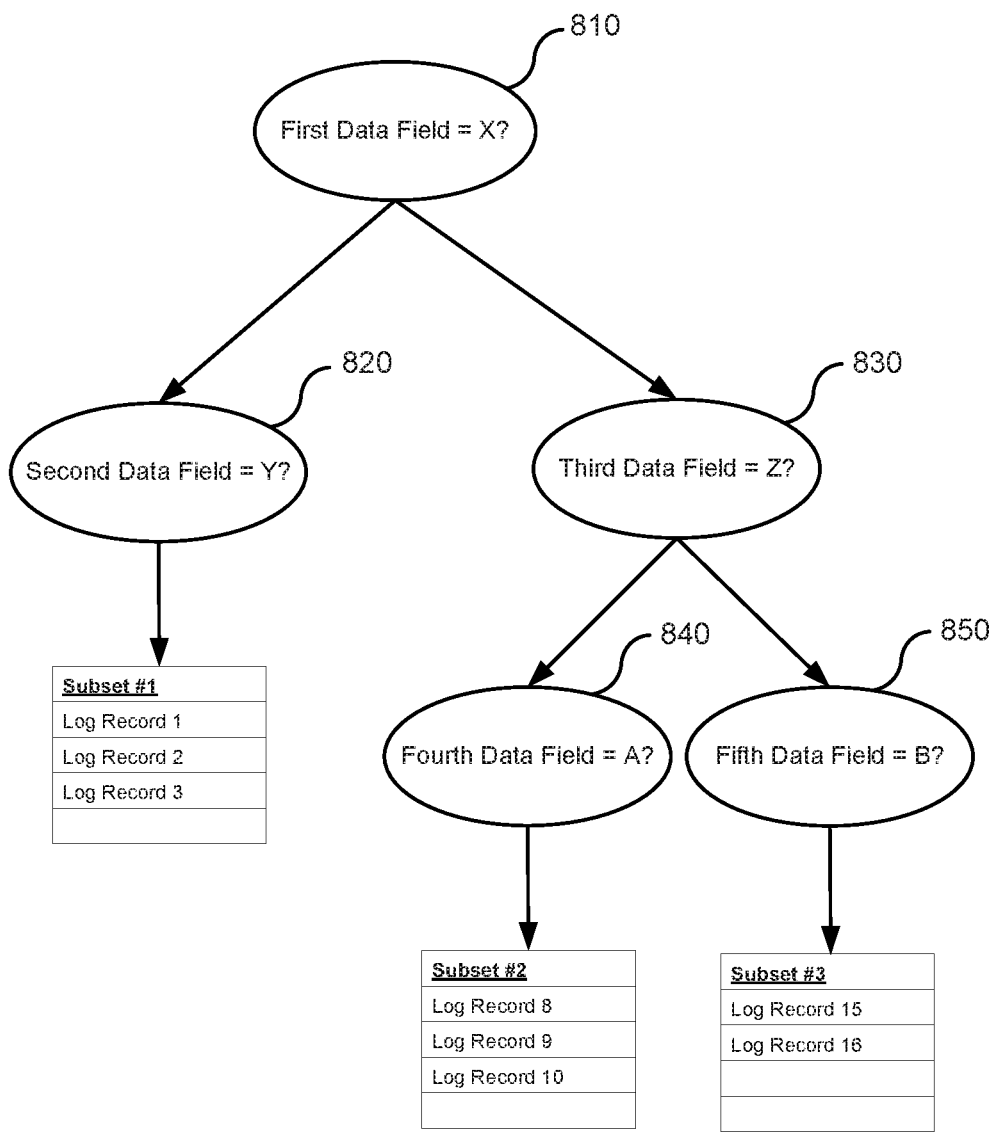
FIG. 8 is a diagram illustrating a flow for processing a data set using a decision tree.

FIG. 8 is a diagram illustrating a flow for processing a large data set using decision tree 800. Decision tree 800 may be created by the decision tree generator within the network of the log analytics system. Further, decision tree 800 may be created to represent a particular data set of tabular data. That is, for two different data sets of tabular data, the log analytics system would generate two different decision trees. Decision tree 800 may include one or more nodes, for example, nodes 810 through 850. Each node may represent a value condition that filters log records based on values included in the log records. A sequence of filters across multiple nodes may result in leaf nodes, such as leaf nodes 820, 840, and 850, as illustrated in the example of FIG. 8. The value conditions in each of nodes 810 through 850 are automatically selected so as to filter log records in a manner that creates leaf nodes corresponding to only log records of a particular cluster.

For example, leaf node 820 corresponds to subset #1 of log records, leaf node 840 corresponds to subset #2 of log records, and leaf node 850 corresponds to subset #3 of log records. Each of subsets #1 through #3 represents an individual cluster of log records that resulted from the clustering operation, as described with respect to FIGS. 5A-5B. In some implementations, the value condition of node 810 is automatically selected so as to filter log records in a manner that results in more log records of a particular cluster than of other clusters. Iteratively filtering out log records that do not belong to a particular cluster results in, for example, leaf node 820. As shown in FIG. 8, node 810 corresponds to a value condition of "first data field=X," which means that the node filters out all log records that do not include the value "X" in "first data field." Here, the reference to the "first data field" does not necessarily mean that the data field is first in the log record, but rather, the first, second, third, fourth, and fifth data fields illustrated in FIG. 8 merely serve to differentiate the data fields from each other. Each of the first, second, third, fourth, and fifth data fields can be any data field of the set of available data fields in the log records of the tabular data.

In some implementations, once decision tree 800 is completed and all of the value conditions and leaf nodes are set, then decision tree 800 is evaluated to automatically select data fields for presenting in the parallel coordinate axes. As described above, each axis of the parallel coordinate chart corresponds to a data field of the set of available data fields in the log records. Advantageously, because the number of data fields in the set of data fields is relatively large (e.g., 30 or more data fields), the automatic selection of a subset of the data fields enables a user to visually understand the various parameters of the values of the tabular data, such as the boundaries of numerical fields, the density distribution of values included in log records, and the variation of values across the same data field of multiple log records. Selecting the data fields for presenting in the parallel coordinate axes includes identifying a path starting from the root node (e.g., a top-level node) and ending at a leaf node. For example, as illustrated in FIG. 8, the path from node 810 to leaf node 820 includes the "first data field" and the "second data field." Thus, the "first data field" and the "second data field" may be automatically selected to be represented as axes in the parallel coordinate chart. Further, the path from node 810 to leaf node 840 includes the "first data field," the "third data field," and the "fourth data field." Thus, the "third data field" and the "fourth data field" may be additionally selected as axes to be represented in the parallel coordinate chart. Lastly, the path from node 810 to leaf node 850 includes the "first data field," the "third data field," and the "fifth data field." Thus, the "fifth data field" may be additionally selected as an axis to be represented in the parallel coordinate axes. Accordingly, in the example of FIG. 8, from amongst all available data fields in the tabular data, the subset of the "first data field," "second data field," "third data field," "fourth data field," and "fifth data field" may be automatically selected to be represented as the axes in the parallel coordinate axes graph. Advantageously, the automatically selection of a subset of data fields also identifies the data fields that are correlated to each cluster of log records. It will be appreciated that, if the decision tree is constrained to a defined height (e.g., maximum of three levels), then a single leaf node may correspond to more than one cluster of rows of tabular data. In this case, a representative sample is selected individually from each cluster of the multiple clusters corresponding to the leaf node.

Figure 9:
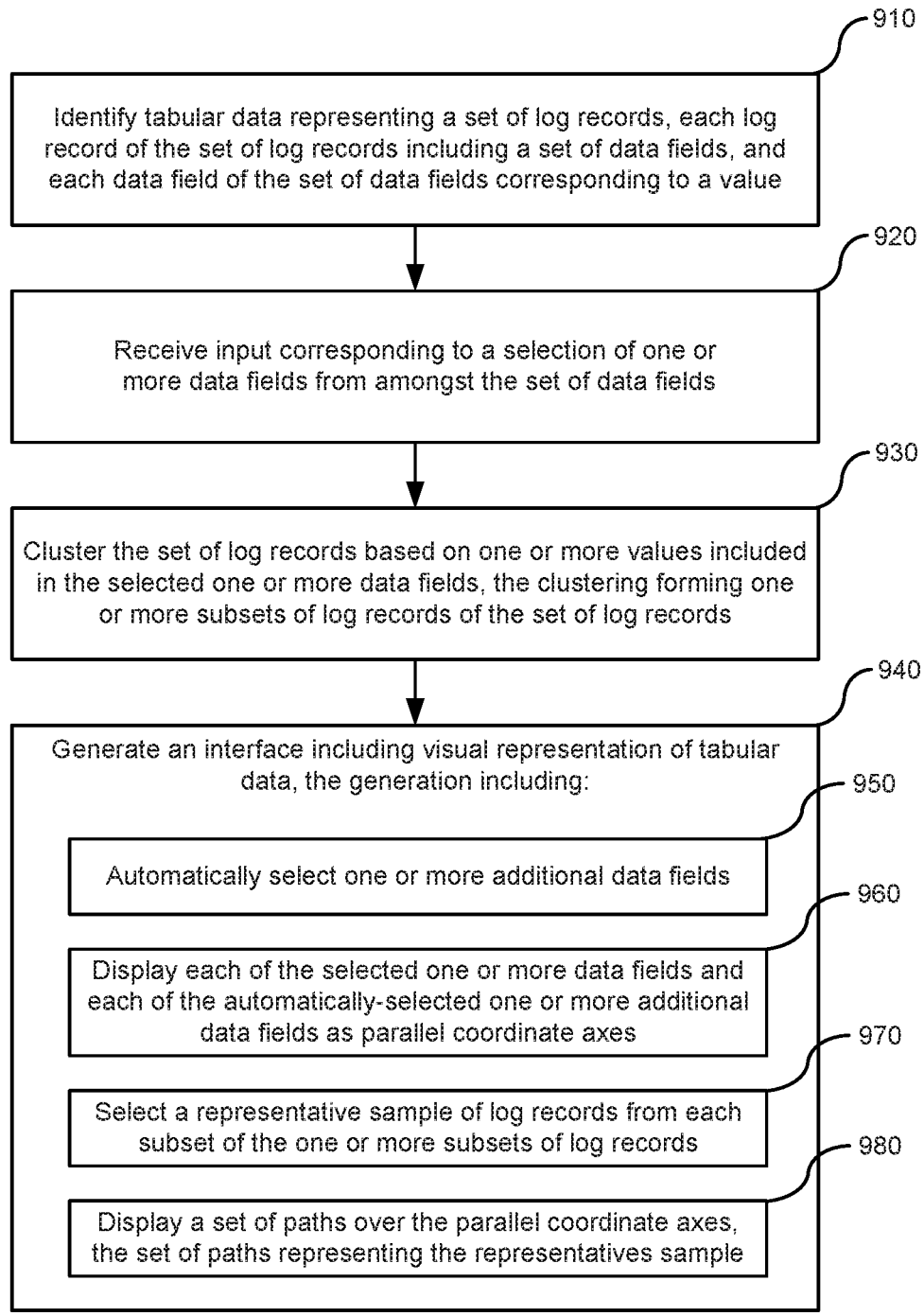
FIG. 9 is a flow diagram illustrating a process for efficiently representing large tabular data across parallel coordinate axes.

FIG. 9 is a flow diagram illustrating process 900 for efficiently representing large tabular data across parallel coordinate axes. Process 900 may be performed by a log analytics system (e.g., log analytics system 101) in order to efficiently and quickly visually depict the density distribution and variation of values included in log records of tabular data. Process 900 begins at block 910 where tabular data is identified. The tabular data represents a set of log records. In some cases, the tabular data can reach big-data scale (e.g., a million rows). Each row of the tabular data may represent a log record. Each log record may include a set of data fields, and each data field may correspond to a value (e.g., a numerical or string value).

At block 920, the log analytics system may receive input corresponding to a selection of one or more data fields from the set of data fields. For example, a user may be navigating an interface provided by the log analytics system. The interface may enable the user to select one or more data fields to be used for a clustering operation on the tabular data. As shown in FIGS. 5A-5B, for example, the user selected the status data field and the duration data field to be used in clustering the tabular data. As a result of the clustering, one or more clusters (e.g., subsets) of log records may be formed from the tabular data.

At block 930, the log analytics system may cluster the set of log records based on the values included in the user-selected data fields. Referring again to the example illustrations of FIGS. 5A-5B, the log analytics system can cluster the tabular data based on the values of the status data field and the duration data field across the multiple log records included in the tabular data. A result of the clustering operation may include one or more subsets of log records, such that the combination of all of the subsets of log records amounts to all of the log records included in the tabular data.

At block 940, the log analytics system may generate an interface, such as interface 600 of FIG. 6. Generating the interface may include block 950, where one or more additional data fields are automatically selected after processing the tabular data into a decision tree, such as decision tree 800 shown in FIG. 8. The decision tree can be used to identify which data fields to automatically select from the set of data fields. The automatically selected data fields, together with the user-selected data fields, may be represented as axes in the parallel coordinate chart or graph. At block 960, each of the user-selected data fields and the additional data fields that were automatically selected may be displayed as parallel coordinates, such that each data field corresponds to a parallel coordinate axis of the multiple parallel coordinate axes. At block 970, a representative sample of log records may be selected from each cluster of log records. The representative samples that are selected may be proportional to or a percentage of the size (e.g., number of rows) of the cluster of log records or rows of tabular data. Further, the total number of representative samples may be below a defined maximum number of log records. At block 980, each of the log records included in the representative samples of log records may be represented at a path or line over the parallel coordinate axes. The path or line represents values included in a log record, in that the path or line intersects a coordinate axis at the value that corresponds to the data field included in that log record. For example, if a log record includes a data center identifier data field, and if the value of that data center identifier data field in the log record is "Salt Lake City," then the path or line representing that log record will be depicted as intersecting the data center axis at the point that marks the "Salt Lake City" value. After all log records of the representative sample are visually depicted, the user can then easily identify the density distribution and variation of values across log messages that exist in the tabular data.

Figure 10:
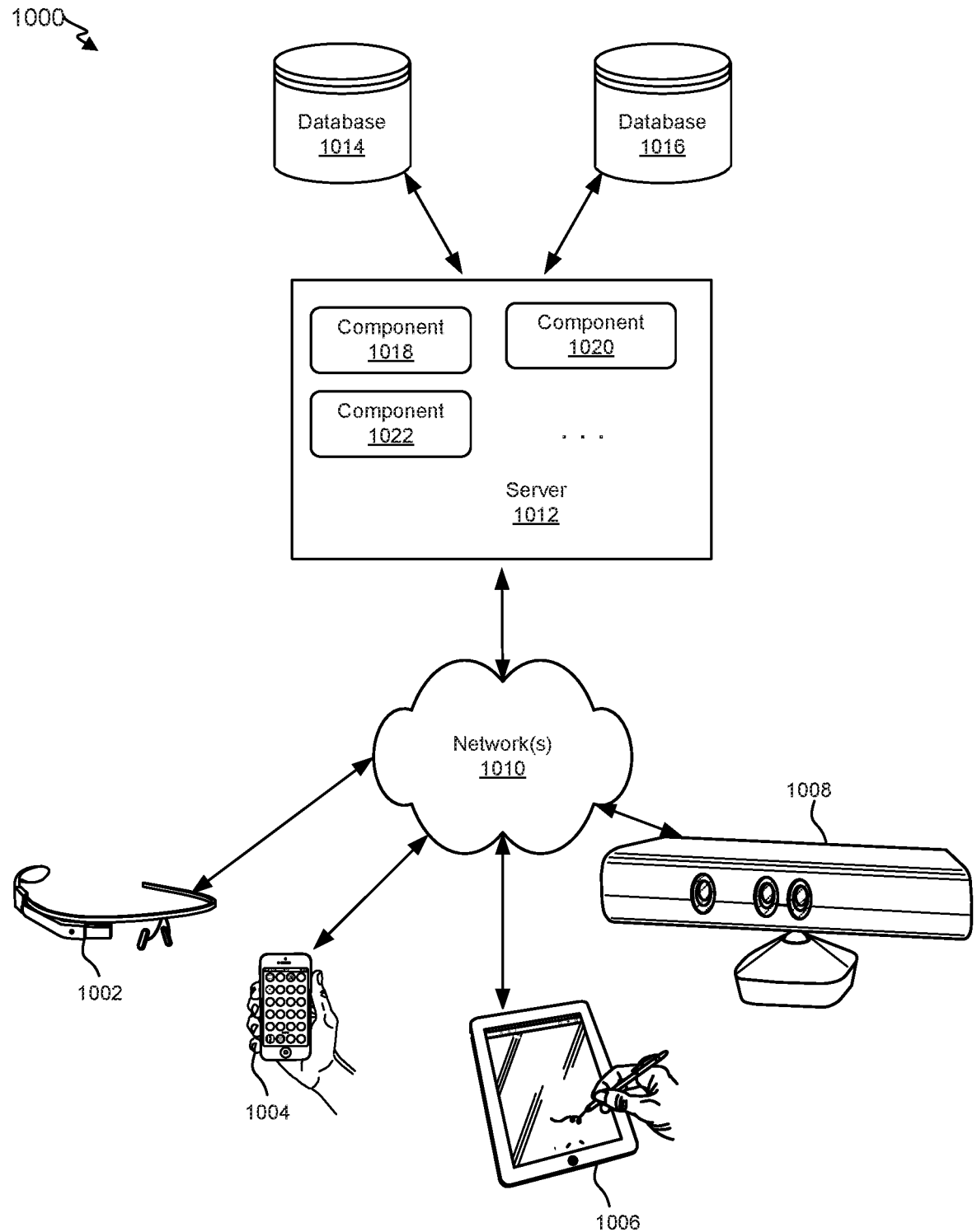
FIG. 10 is a simplified diagram illustrating a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
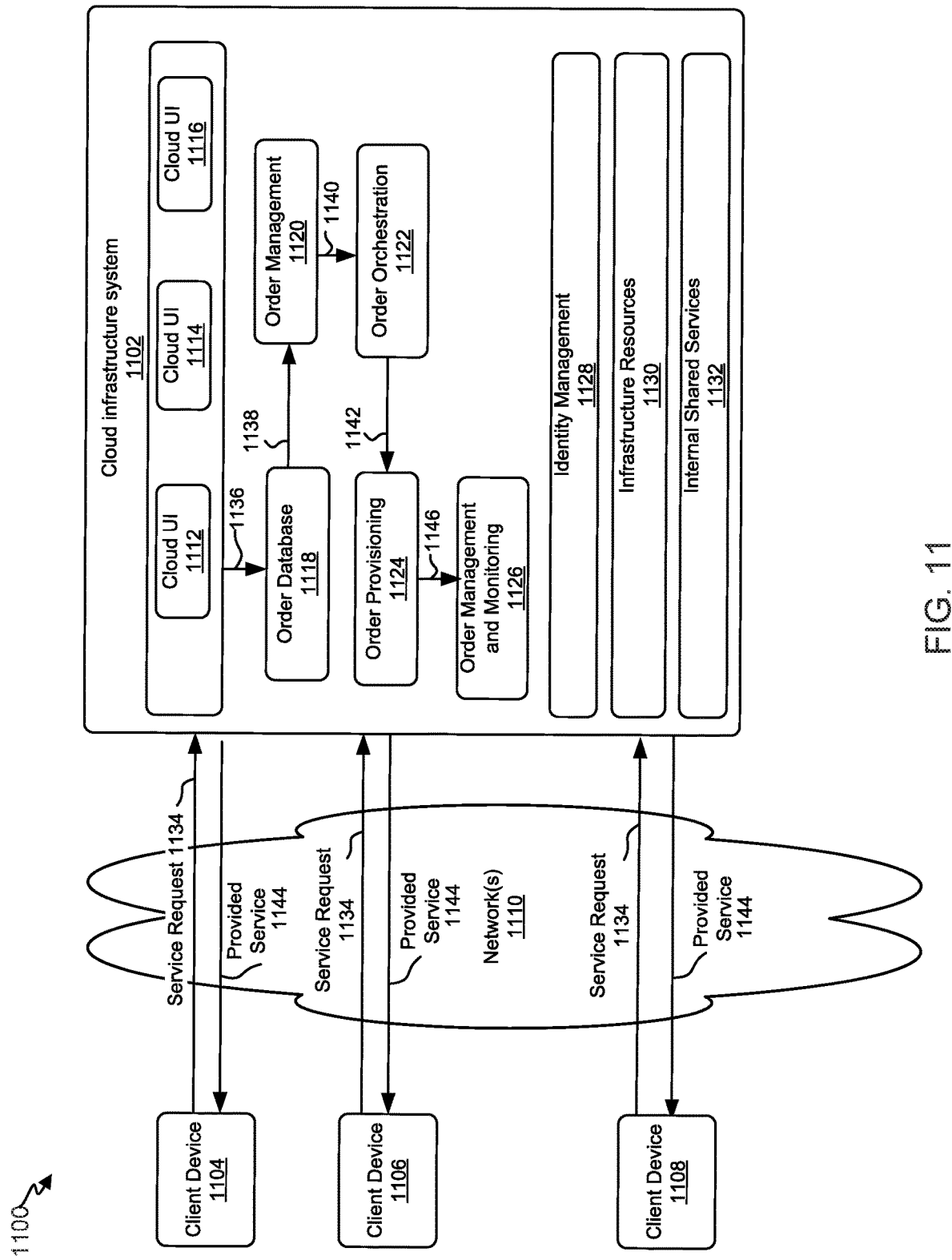
FIG. 11 is a simplified block diagram illustrating one or more components of a system environment.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 802 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of processes associated with each order and applies logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.). Identity management module 1128 may also include the management of descriptive information about each customer and about how and by whom that descriptive information can be accessed and modified.

Figure 12:
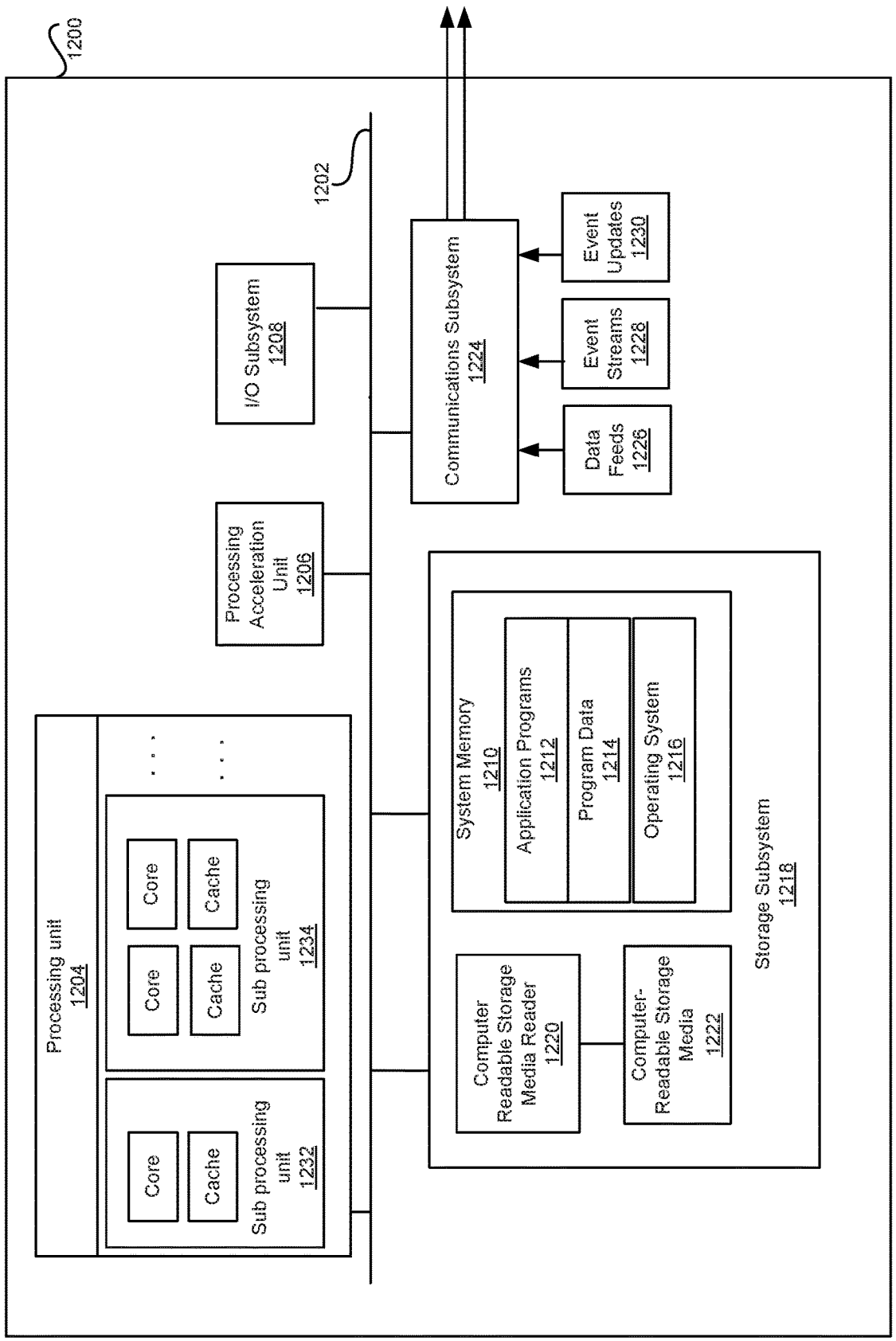
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 924 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
    storing a set of log records, each log record of the set of log records including a set of data fields, and each data field of the set of data fields corresponding to a value;
    identifying tabular data representing the set of log records, the tabular data including a set of rows and a set of columns, each row of the set of rows representing one or more log records of the set of log records, and each column of the set of columns representing a data field of the set of data fields;
    receiving input corresponding to a user selection of one or more first data fields from amongst the set of data fields;
    clustering the tabular data based on one or more values corresponding to the user-selected one or more first data fields, the clustering forming one or more subsets of rows of the set of rows of the tabular data;
    generating an interface including a visual representation of the tabular data, the generation including:
        automatically selecting, for each subset of the one or more subsets of rows, one or more second data fields from the set of data fields, the automatic selection of the one or more other data fields indicating a correlation between a value of the one or more other data fields and the subset of rows, wherein the one or more first data fields are different from the one or more second data fields;
        displaying a plurality of parallel coordinate axes in the visual representation of the tabular data, each parallel coordinate axis of the plurality of parallel coordinate axes representing a range of values, wherein at least a first parallel coordinate axis represents the one or more first data fields and a second parallel coordinate axis represents the one or more second data fields; and
        selecting, from each subset of rows of the one or more subsets of rows of the tabular data, at least one representative row; and
    displaying a set of paths across the parallel coordinate axes, each path of the set of paths corresponding to a representative row of one or more representative rows, and wherein for each representative row of the one or more representative rows, the path corresponding to the representative row intersects at least the first parallel coordinate axis of the parallel coordinate axes at a value of a first data field included in the representative row and a second parallel coordinate axis of the plurality of parallel coordinate axes at a value of a second data field included in the representative row.

2. The computer-implemented method of claim 1, wherein the automatic selection of the one or more other data fields further comprises:
    processing the tabular data to generate a decision tree, wherein the decision tree includes one or more nodes, each node of the one or more nodes of the decision tree corresponding to a condition that filters the set of rows of the tabular data, the condition corresponding to a particular value of a particular data field from the set of data fields;
    identifying one or more leaf nodes of the decision tree, each leaf node of the one or more leaf nodes representing a subset of rows of the one or more subsets of rows formed by clustering the tabular data;
    determining, for each leaf node of the one or more leaf nodes, a sequence of nodes of the decision tree that filters the set of rows of the tabular data to a subset of rows that corresponds to the leaf node, the sequence of nodes including one or more conditions that filter the set of rows of the tabular data to a particular subset of rows of the one or more subsets of rows, and each condition included in the one or more conditions corresponding to a data field of the one or more other data fields; and
    automatically selecting the one or more other data fields based on the one or more conditions included in the sequence of nodes.

3. The computer-implemented method of claim 2, wherein selecting the representative sample of rows from each subset of rows further comprises:
    defining a maximum number of rows for selection, the maximum number of rows being lower than a total number of rows included in the set of rows of the tabular data;
    for each subset of rows of the one or more subsets of rows, identifying a percentage of the maximum number of rows based on a number of rows included in the subset of rows; and
    selecting the representative sample of rows for each subset of the one or more subsets of rows, the selection of rows of the representative sample being based on the percentage of the maximum number of rows that corresponds to the subset of rows.

4. The computer-implemented method of claim 1, wherein at least one of the automatically-selected one or more second data fields is not included in the set of data fields, but rather is a time-related data field that is automatically-created or is a data field derived from at least a third data field included in the set of data fields.

5. The computer-implemented method of claim 1, further comprising:
receiving an additional input corresponding to a selection of an area of the parallel coordinate axes;
identifying a number of rows visually represented within the selected area of the parallel coordinate axes; and
visually inhibiting remaining rows of the representative sample not included in the selected area of the parallel coordinate axes.

6. The computer-implemented method of claim 1, further comprising:
receiving an additional input corresponding to a selection of one or more values represented on the parallel coordinate axes, each value of the one or more values corresponding to a data field represented by a parallel coordinate axis;
in response to receiving the additional input, constructing a filter query based on the selected one or more values and one or more data fields that correspond to the selected one or more values; and
querying the tabular data using the selected one or more values and the corresponding one or more data fields.

7. The computer-implemented method of claim 1, wherein each representative row selected from each row of the subset of rows is selected to include anomalous values included in the subset of rows.

8. A system, comprising:
one or more data processors; and
a non-transitory computer-readable storage medium containing instructions which, when executed on the one or more data processors, cause the one or more data processors to perform operations including:
storing a set of log records, each log record of the set of log records including a set of data fields, and each data field of the set of data fields corresponding to a value;
identifying tabular data representing the set of log records, the tabular data including a set of rows and a set of columns, each row of the set of rows representing one or more log records of the set of log records, and each column of the set of columns representing a data field of the set of data fields;
receiving input corresponding to a user selection of one or more first data fields from amongst the set of data fields;
clustering the tabular data based on one or more values corresponding to the user-selected one or more first data fields, the clustering forming one or more subsets of rows of the set of rows of the tabular data;
generating an interface including a visual representation of the tabular data, the generation including:
automatically selecting, for each subset of the one or more subsets of rows, one or more second data fields from the set of data fields, the automatic selection of the one or more other data fields indicating a correlation between a value of the one or more other data fields and the subset of rows, wherein the one or more first data fields are different from the one or more second data fields;
displaying a plurality of parallel coordinate axes in the visual representation of the tabular data, each parallel coordinate axis of the plurality of parallel coordinate axes representing a range of values, wherein at least a first parallel coordinate axis represents the one or more first data fields and a second parallel coordinate axis represents the one or more second data fields; and
selecting, from each subset of rows of the one or more subsets of rows of the tabular data, at least one representative row; and
displaying a set of paths across the parallel coordinate axes, each path of the set of paths corresponding to a representative row of one or more representative rows, and wherein for each representative row of the one or more representative rows, the path corresponding to the representative row intersects at least the first parallel coordinate axis of the parallel coordinate axes at a value of a first data field included in the representative row and a second parallel coordinate axis of the plurality of parallel coordinate axes at a value of a second data field included in the representative row.

9. The system of claim 8, wherein the automatic selection of the one or more other data fields further comprises:
processing the tabular data to generate a decision tree, wherein the decision tree includes one or more nodes, each node of the one or more nodes of the decision tree corresponding to a condition that filters the set of rows of the tabular data, the condition corresponding to a particular value of a particular data field from the set of data fields;
identifying one or more leaf nodes of the decision tree, each leaf node of the one or more leaf nodes representing a subset of rows of the one or more subsets of rows formed by clustering the tabular data;
determining, for each leaf node of the one or more leaf nodes, a sequence of nodes of the decision tree that filters the set of rows of the tabular data to a subset of rows that corresponds to the leaf node, the sequence of nodes including one or more conditions that filter the set of rows of the tabular data to a particular subset of rows of the one or more subsets of rows, and each condition included in the one or more conditions corresponding to a data field of the one or more other data fields; and
automatically selecting the one or more other data fields based on the one or more conditions included in the sequence of nodes.

10. The system of claim 9, wherein selecting the representative sample of rows from each subset of rows further comprises:
defining a maximum number of rows for selection, the maximum number of rows being lower than a total number of rows included in the set of rows of the tabular data;
for each subset of rows of the one or more subsets of rows, identifying a percentage of the maximum number of rows based on a number of rows included in the subset of rows; and selecting the representative sample of rows for each subset of the one or more subsets of rows, the selection of rows of the representative sample being based on the percentage of the maximum number of rows that corresponds to the subset of rows.

11. The system of claim 8, wherein at least one of the automatically-selected one or more second data fields is not included in the set of data fields, but rather is a time-related data field that is automatically-created or is a data field derived from at least a third data field included in the set of data fields.

12. The system of claim 8, wherein the operations further comprise:
receiving an additional input corresponding to a selection of an area of the parallel coordinate axes;

identifying a number of rows visually represented within the selected area of the parallel coordinate axes; and visually inhibiting remaining rows of the representative sample not included in the selected area of the parallel coordinate axes.

13. The system of claim 8, further comprising:

receiving an additional input corresponding to a selection of one or more values represented on the parallel coordinate axes, each value of the one or more values corresponding to a data field represented by a parallel coordinate axis;

in response to receiving the additional input, constructing a filter query based on the selected one or more values and one or more data fields that correspond to the selected one or more values; and querying the tabular data using the selected one or more values and the corresponding one or more data fields.

14. The system of claim 8, herein each representative row selected from each row of the subset of rows is selected to include anomalous values included in the subset of rows.

15. A computer-program product tangibly embodied in a non-transitory machine-readable storage medium, including instructions configured to cause a data processing apparatus to perform operations including:

storing a set of log records, each log record of the set of log records including a set of data fields, and each data field of the set of data fields corresponding to a value;

identifying tabular data representing the set of log records, the tabular data including a set of rows and a set of columns, each row of the set of rows representing one or more log records of the set of log records, and each column of the set of columns representing a data field of the set of data fields;

receiving input corresponding to a user selection of one or more first data fields from amongst the set of data fields;

clustering the tabular data based on one or more values corresponding to the user-selected one or more first data fields, the clustering forming one or more subsets of rows of the set of rows of the tabular data;

generating an interface including a visual representation of the tabular data, the generation including:

automatically selecting, for each subset of the one or more subsets of rows, one or more second data fields from the set of data fields, the automatic selection of the one or more other data fields indicating a correlation between a value of the one or more other data fields and the subset of rows, wherein the one or more first data fields are different from the one or more second data fields;

displaying a plurality of parallel coordinate axes in the visual representation of the tabular data, each parallel coordinate axis of the plurality of parallel coordinate axes representing a range of values, wherein at least a first parallel coordinate axis represents the one or more first data fields and a second parallel coordinate axis represents the one or more second data fields; and selecting, from each subset of rows of the one or more subsets of rows of the tabular data, at least one representative row; and displaying a set of paths across the parallel coordinate axes, each path of the set of paths corresponding to a representative row of one or more representative rows, and wherein for each representative row of the one or more representative rows, the path corresponding to the representative row intersects at least the first parallel coordinate axis of the parallel coordinate axes at a value of a first data field included in the representative row and a second parallel coordinate axis of the plurality of parallel coordinate axes at a value of a second data field included in the representative row.

16. The computer-program product of claim 15, wherein the automatic selection of the one or more other data fields further comprises:

processing the tabular data to generate a decision tree, wherein the decision tree includes one or more nodes, each node of the one or more nodes of the decision tree corresponding to a condition that filters the set of rows of the tabular data, the condition corresponding to a particular value of a particular data field from the set of data fields;

identifying one or more leaf nodes of the decision tree, each leaf node of the one or more leaf nodes representing a subset of rows of the one or more subsets of rows formed by clustering the tabular data;

determining, for each leaf node of the one or more leaf nodes, a sequence of nodes of the decision tree that filters the set of rows of the tabular data to a subset of rows that corresponds to the leaf node, the sequence of nodes including one or more conditions that filter the set of rows of the tabular data to a particular subset of rows of the one or more subsets of rows, and each condition included in the one or more conditions corresponding to a data field of the one or more other data fields; and automatically selecting the one or more other data fields based on the one or more conditions included in the sequence of nodes.

17. The computer-program product of claim 16, wherein selecting the representative sample of rows from each subset of rows further comprises:

defining a maximum number of rows for selection, the maximum number of rows being lower than a total number of rows included in the set of rows of the tabular data;

for each subset of rows of the one or more subsets of rows, identifying a percentage of the maximum number of rows based on a number of rows included in the subset of rows; and selecting the representative sample of rows for each subset of the one or more subsets of rows, the selection of rows of the representative sample being based on the percentage of the maximum number of rows that corresponds to the subset of rows.

18. The computer-program product of claim 15, wherein at least one of the automatically-selected one or more second data fields is not included in the set of data fields, but rather is a time-related data field that is automatically-created or is a data field derived from at least a third data field included in the set of data fields.

19. The computer-program product of claim 15, wherein the operations further comprise:

receiving an additional input corresponding to a selection of an area of the parallel coordinate axes;

identifying a number of rows visually represented within the selected area of the parallel coordinate axes; and visually inhibiting remaining rows of the representative sample not included in the selected area of the parallel coordinate axes.

20. The computer-program product of claim 15, further comprising:

receiving an additional input corresponding to a selection of one or more values represented on the parallel coordinate axes, each value of the one or more values corresponding to a data field represented by a parallel coordinate axis;

in response to receiving the additional input, constructing a filter query based on the selected one or more values and one or more data fields that correspond to the selected one or more values; and querying the tabular data using the selected one or more values and the corresponding one or more data fields.

* * * * *

UNITED STATES PATENT AND TRADEMARK OFFICE
CERTIFICATE OF CORRECTION

PATENT NO. : 11,354,836 B2
APPLICATION NO. : 16/521268
DATED : June 7, 2022
INVENTOR(S) : Kumaresan et al.

It is certified that error appears in the above-identified patent and that said Letters Patent is hereby corrected as shown below:

In the Drawings

On sheet 1 of 15, in FIG. 1A, under Reference Numeral 110b, Line 1, delete "Raw/historial" and insert -- Raw/historical --, therefor.

In the Specification

In Column 11, Line 26, delete "that that" and insert -- that --, therefor.

In Column 12, Line 46, delete "DataIlodes" and insert -- DataNodes --, therefor.

In Column 14, Line 67, delete "analysis." and insert -- analysis). --, therefor.

In Column 17, Line 4, delete "interactions More" and insert -- interactions. More --, therefor.

In Column 34, Line 36, delete "evolution)" and insert -- evolution)) --, therefor.

Signed and Sealed this
Twenty-second Day of November, 2022

Katherine Kelly Vidal
*Director of the United States Patent and Trademark Office*